United States Patent
Kamran et al.

(10) Patent No.: US 12,050,556 B2
(45) Date of Patent: Jul. 30, 2024

(54) STRIPE DEFRAGMENTATION AND REBUILD BASED ON STRIPE ACCESS FREQUENCY

(71) Applicant: EMC IP Holding Company LLC, Hopkinton, MA (US)

(72) Inventors: Lior Kamran, Rishon LeZion (IL); Vladimir Shveidel, Pardes-Hana (IL); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 330 days.

(21) Appl. No.: 17/359,774

(22) Filed: Jun. 28, 2021

(65) Prior Publication Data

US 2022/0414062 A1    Dec. 29, 2022

(51) Int. Cl.
G06F 16/17 (2019.01)
G06F 16/16 (2019.01)

(52) U.S. Cl.
CPC ........ G06F 16/1724 (2019.01); G06F 16/164 (2019.01)

(58) Field of Classification Search
CPC ............................ G06F 16/1724; G06F 16/164
See application file for complete search history.

(56) References Cited

U.S. PATENT DOCUMENTS

| | | |
|---|---|---|
| 7,165,155 B1 | 1/2007 | Duprey et al. |
| 7,440,982 B2 | 10/2008 | Lu et al. |
| 7,444,464 B2 | 10/2008 | Urmston et al. |
| 8,095,726 B1 | 1/2012 | O'Connell et al. |

(Continued)

FOREIGN PATENT DOCUMENTS

| | | |
|---|---|---|
| WO | 2016111954 A1 | 7/2016 |
| WO | PCT/US2019/024885 | 1/2020 |
| WO | PCT/US2019/024900 | 1/2020 |
| WO | 2020204880 A1 | 10/2020 |
| WO | 2020204882 A1 | 10/2020 |

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Mark D Featherstone
*Assistant Examiner* — Faezeh Forouharnejad
(74) *Attorney, Agent, or Firm* — Ryan, Mason & Lewis, LLP

(57) ABSTRACT

A method comprises maintaining stripe metadata corresponding to stripes of data stored on a plurality of storage devices. The stripe metadata comprises a first timestamp, a second timestamp and a read count for each stripe. The method comprises obtaining a read request associated with a given stripe and having an associated timestamp and determining whether or not a time period for the given stripe has been exceeded. The method comprises updating the stripe metadata corresponding to the given stripe based at least in part on the determination and the associated timestamp and determining a read access frequency of the given stripe based at least in part on the read count, the first timestamp and the second timestamp of the updated stripe metadata. The method comprises performing at least one of a defragmentation process and a rebuild process based at least in part on the determined read access frequency.

20 Claims, 10 Drawing Sheets

(56) References Cited

U.S. PATENT DOCUMENTS

| | | |
|---|---|---|
| 8,214,612 B1 | 7/2012 | Natanzon |
| 8,301,593 B2 | 10/2012 | Hoffmann et al. |
| 8,335,899 B1 | 12/2012 | Meiri et al. |
| 8,788,755 B2 * | 7/2014 | Satran ............... G06F 12/0868 711/201 |
| 9,104,326 B2 | 8/2015 | Frank et al. |
| 9,208,162 B1 | 12/2015 | Hallak et al. |
| 9,286,003 B1 | 3/2016 | Hallak et al. |
| 9,514,014 B2 | 12/2016 | Webman et al. |
| 9,552,258 B2 | 1/2017 | Hallak et al. |
| 9,606,870 B1 | 3/2017 | Meiri et al. |
| 9,716,754 B2 | 7/2017 | Swift |
| 9,891,994 B1 | 2/2018 | Schneider et al. |
| 10,176,046 B1 | 1/2019 | Hu et al. |
| 10,261,693 B1 | 4/2019 | Schneider et al. |
| 10,324,640 B1 | 6/2019 | Chen et al. |
| 10,338,851 B1 | 7/2019 | Kronrod et al. |
| 10,359,965 B1 | 7/2019 | Stronge et al. |
| 10,394,485 B1 | 8/2019 | Chen et al. |
| 10,437,501 B1 | 10/2019 | Kucherov et al. |
| 10,437,855 B1 | 10/2019 | Stronge et al. |
| 10,466,925 B1 | 11/2019 | Blanco et al. |
| 10,496,324 B2 | 12/2019 | Meiri et al. |
| 10,496,489 B1 | 12/2019 | Chen et al. |
| 10,496,672 B2 | 12/2019 | Meiri et al. |
| 10,558,613 B1 | 2/2020 | Shveidel et al. |
| 10,592,159 B2 | 3/2020 | Kucherov et al. |
| 10,592,161 B1 | 3/2020 | Chen et al. |
| 10,606,519 B1 | 3/2020 | Shveidel |
| 10,635,533 B2 | 4/2020 | Schneider et al. |
| 10,642,690 B1 * | 5/2020 | Tian .................. G06F 3/061 |
| 10,684,915 B2 | 6/2020 | Schneider et al. |
| 10,691,355 B2 | 6/2020 | Kucherov et al. |
| 10,691,373 B2 | 6/2020 | Harduf et al. |
| 10,691,551 B2 | 6/2020 | Meiri et al. |
| 10,698,772 B2 | 6/2020 | Hu et al. |
| 10,705,965 B2 | 7/2020 | Shveidel et al. |
| 10,719,253 B2 | 7/2020 | Alkalay et al. |
| 10,725,855 B2 | 7/2020 | Shani et al. |
| 10,754,559 B1 | 8/2020 | Meiri et al. |
| 10,754,575 B2 | 8/2020 | Stronge |
| 10,754,736 B2 | 8/2020 | Shani et al. |
| 10,761,933 B2 | 9/2020 | Moore et al. |
| 10,783,038 B2 | 9/2020 | Moore et al. |
| 10,817,385 B2 | 10/2020 | Meiri et al. |
| 10,824,512 B2 | 11/2020 | Resnik et al. |
| 10,826,990 B2 | 11/2020 | Kamran et al. |
| 10,831,407 B2 | 11/2020 | Glimcher et al. |
| 10,831,735 B2 | 11/2020 | Schneider et al. |
| 10,838,863 B2 | 11/2020 | Kamran et al. |
| 10,846,178 B2 | 11/2020 | Meiri |
| 10,852,965 B2 | 12/2020 | Glimcher et al. |
| 10,852,974 B2 | 12/2020 | Kucherov et al. |
| 10,852,999 B2 | 12/2020 | Schneider et al. |
| 10,860,234 B2 | 12/2020 | Stronge et al. |
| 10,860,241 B2 | 12/2020 | Meiri et al. |
| 10,866,735 B2 | 12/2020 | Meiri et al. |
| 10,866,760 B2 | 12/2020 | Chen et al. |
| 10,866,934 B1 | 12/2020 | Chen et al. |
| 10,866,969 B2 | 12/2020 | Chen et al. |
| 10,871,960 B2 | 12/2020 | Bashi et al. |
| 10,871,991 B2 | 12/2020 | Alkalay et al. |
| 10,884,650 B1 | 1/2021 | Meiri et al. |
| 10,884,651 B2 | 1/2021 | Chen et al. |
| 10,884,799 B2 | 1/2021 | Alkalay et al. |
| 10,891,195 B2 | 1/2021 | Chen |
| 10,901,847 B2 | 1/2021 | Shani et al. |
| 10,909,001 B1 | 2/2021 | Kucherov et al. |
| 10,951,699 B1 | 3/2021 | Sayles et al. |
| 11,036,602 B1 | 6/2021 | Tal |
| 11,169,923 B2 * | 11/2021 | Anastasiev ......... G06F 12/0246 |
| 2007/0022121 A1 | 1/2007 | Bahar et al. |
| 2008/0279462 A1 | 11/2008 | Celi, Jr. |
| 2009/0132955 A1 | 5/2009 | Garg et al. |
| 2009/0276593 A1 | 11/2009 | Jacobson et al. |
| 2010/0179941 A1 | 7/2010 | Agrawal et al. |
| 2011/0022566 A1 | 1/2011 | Beaverson et al. |
| 2011/0225123 A1 | 9/2011 | D'Souza et al. |
| 2012/0124282 A1 | 5/2012 | Frank et al. |
| 2013/0305002 A1 | 11/2013 | Hallak et al. |
| 2013/0325824 A1 | 12/2013 | Shoens |
| 2014/0181016 A1 | 6/2014 | Whitehead et al. |
| 2014/0244935 A1 | 8/2014 | Ezra et al. |
| 2014/0250282 A1 * | 9/2014 | Yamamoto ............ G06F 3/0641 711/161 |
| 2015/0378766 A1 | 12/2015 | Beveridge et al. |
| 2015/0378785 A1 | 12/2015 | Tarasuk-Levin et al. |
| 2016/0150012 A1 | 5/2016 | Barszczak et al. |
| 2016/0170987 A1 | 6/2016 | Kesselman |
| 2016/0202927 A1 | 7/2016 | Klarakis et al. |
| 2016/0224259 A1 | 8/2016 | Ahrens et al. |
| 2016/0261513 A1 | 9/2016 | Aingaran et al. |
| 2016/0345207 A1 | 11/2016 | Kwak et al. |
| 2017/0075842 A1 | 3/2017 | Su et al. |
| 2017/0185529 A1 | 6/2017 | Chhabra et al. |
| 2017/0192857 A1 | 7/2017 | Meiri et al. |
| 2018/0095873 A1 | 4/2018 | Nakagoe et al. |
| 2018/0165208 A1 * | 6/2018 | Farey .................. G06F 12/0868 |
| 2019/0303490 A1 | 10/2019 | Chen et al. |
| 2019/0370354 A1 | 12/2019 | Kucherov et al. |
| 2019/0370355 A1 | 12/2019 | Kucherov et al. |
| 2019/0370356 A1 | 12/2019 | Kucherov et al. |
| 2019/0370357 A1 | 12/2019 | Kucherov et al. |
| 2019/0392060 A1 | 12/2019 | Meiri et al. |
| 2020/0026616 A1 | 1/2020 | Hu et al. |
| 2020/0097174 A1 | 3/2020 | Moore et al. |
| 2020/0097363 A1 | 3/2020 | Moore et al. |
| 2020/0097393 A1 | 3/2020 | Moore et al. |
| 2020/0125276 A1 | 4/2020 | Shani et al. |
| 2020/0218601 A1 | 7/2020 | Schneider et al. |
| 2020/0218610 A1 | 7/2020 | Schneider et al. |
| 2020/0225849 A1 | 7/2020 | Meiri et al. |
| 2020/0226023 A1 | 7/2020 | Meiri |
| 2020/0226145 A1 | 7/2020 | Meiri |
| 2020/0233704 A1 | 7/2020 | Alkalay et al. |
| 2020/0233705 A1 | 7/2020 | Alkalay et al. |
| 2020/0233881 A1 | 7/2020 | Harduf et al. |
| 2020/0242130 A1 | 7/2020 | Chen et al. |
| 2020/0249868 A1 | 8/2020 | Glimcher et al. |
| 2020/0249869 A1 | 8/2020 | Glimcher et al. |
| 2020/0250089 A1 | 8/2020 | Kamran et al. |
| 2020/0250144 A1 | 8/2020 | Natanzon et al. |
| 2020/0272542 A1 | 8/2020 | Meiri et al. |
| 2020/0272600 A1 | 8/2020 | Natanzon et al. |
| 2020/0285268 A1 | 9/2020 | Meiri et al. |
| 2020/0285402 A1 | 9/2020 | Meiri et al. |
| 2020/0301784 A1 | 9/2020 | Chen |
| 2020/0310649 A1 | 10/2020 | Chen et al. |
| 2020/0310654 A1 | 10/2020 | Meiri et al. |
| 2020/0326877 A1 | 10/2020 | Chen et al. |
| 2020/0327024 A1 | 10/2020 | Alkalay et al. |
| 2020/0341641 A1 | 10/2020 | Kucherov et al. |
| 2020/0341682 A1 | 10/2020 | Kucherov et al. |
| 2020/0341749 A1 | 10/2020 | Bashi et al. |
| 2020/0364106 A1 | 11/2020 | Chen et al. |
| 2020/0401314 A1 | 12/2020 | Chen et al. |
| 2020/0401315 A1 | 12/2020 | Chen et al. |
| 2021/0019229 A1 | 1/2021 | Kucherov et al. |
| 2021/0034267 A1 | 2/2021 | Kucherov et al. |
| 2021/0124494 A1 | 4/2021 | Chen et al. |
| 2021/0124657 A1 | 4/2021 | Kamran et al. |
| 2021/0132839 A1 | 5/2021 | Kamran et al. |
| 2021/0157695 A1 | 5/2021 | Tal |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

(56) References Cited

OTHER PUBLICATIONS

EMC Corporation, "XtremIO Data Protection (XDP): Flash-Specific Data Protection, Provided by XtremIO (Ver. 4.0)," White Paper, Apr. 2015, 25 pages.
Dell EMC, "XtremIO v6.0 Specifications," Specification Sheet, 2017, 4 pages.
Dell EMC, "Dell EMC XtremIO X2: Next-Generation All-Flash Array," Data Sheet, 2017, 5 pages.
Emc Corporation, "High Availability, Data Protection and Data Integrity in the XtremIO Architecture," White Paper, Apr. 2015, 28 pages.
Dell EMC, "Introduction to Dell EMC XtremIO X2 Storage Array—A Detailed Review," Dell EMC White Paper, Aug. 2017, 46 pages.
N. Tolia et al., "Opportunistic Use of Content Addressable Storage for Distributed File Systems," Proceedings of the USENIX Annual Technical Conference, Jun. 9-14, 2003, 14 pages.
EMC Corporation, "EMC Recoverpoint Replication of XtremIO: Understanding the Essentials of RecoverPoint Snap-Based Replication for XtremIO," EMC White Paper, Aug. 2015, 31 pages.
Dell EMC, "Introduction to Dell EMC XtremIO X2 Storage Array—A Detailed Review," Dell EMC White Paper, Apr. 2018, 52 pages.
Dell EMC, "Introduction to XtremIO Metadata-Aware Replication," Dell EMC White Paper, Apr. 2018, 18 pages.
Dell EMC, "PowerMax OS," Dell EMC PowerMax Family Product Guide, May 2019, 192 pages.
Dell EMC, "Dell EMC VxRack FLEX," Dell EMC Product Overview, 2018, 5 pages.

\* cited by examiner

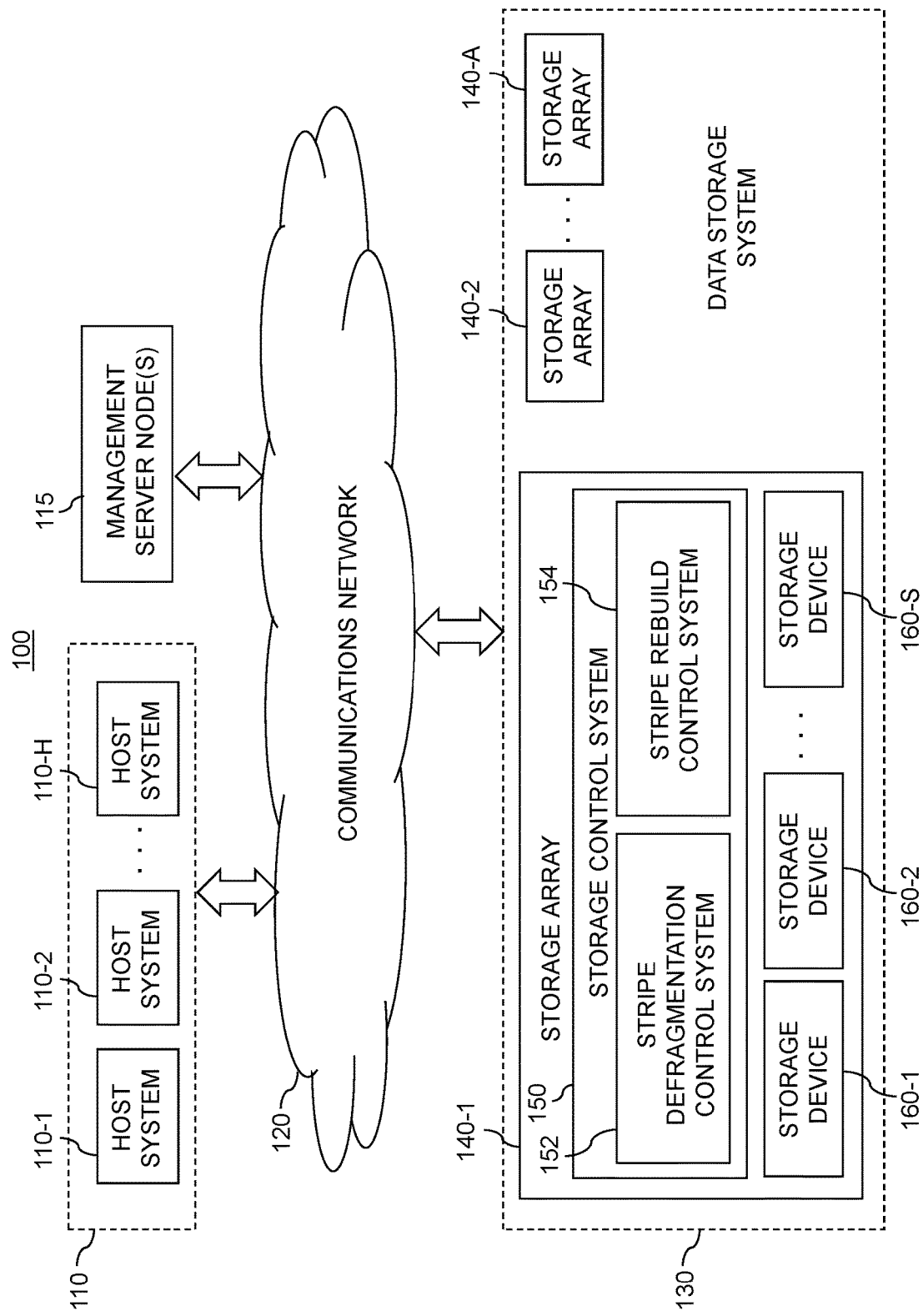

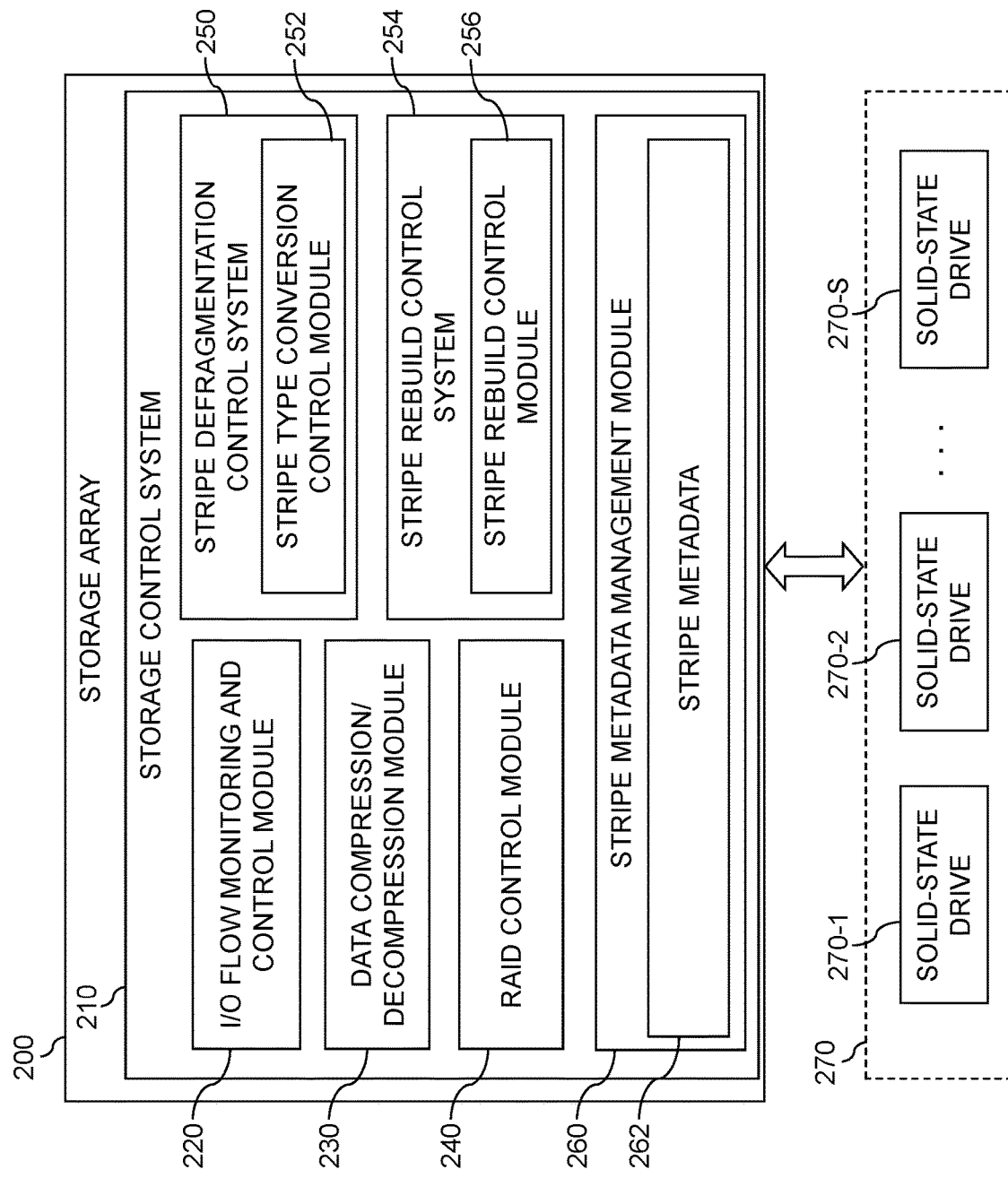

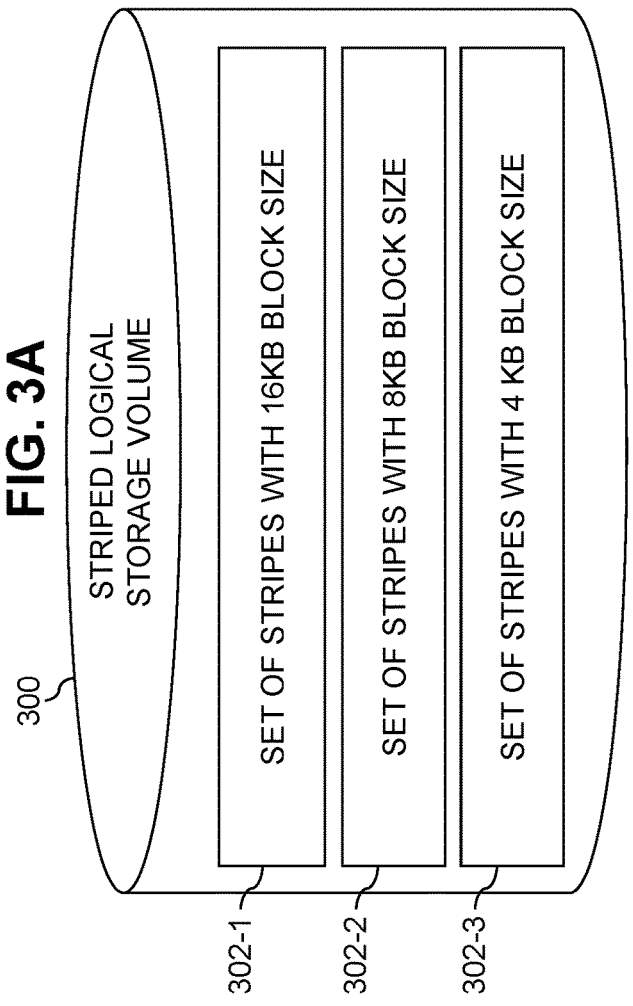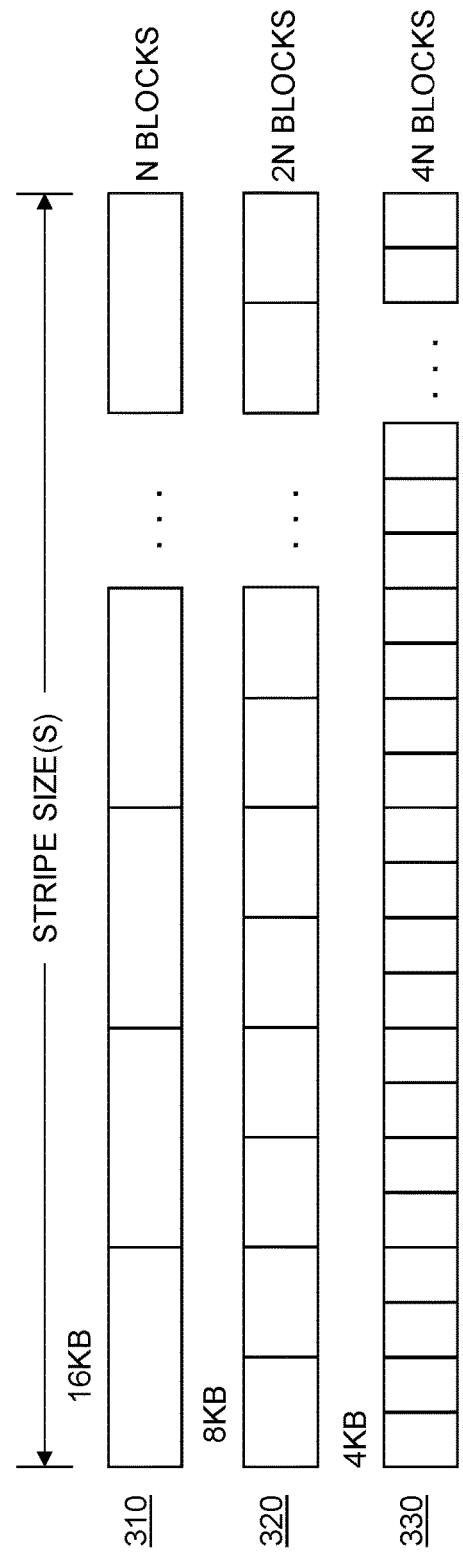

400

STRIPE DEFRAGMENTATION AND REBUILD BASED ON STRIPE ACCESS FREQUENCY

TECHNICAL FIELD

This disclosure relates generally to storage systems and, more specifically, to techniques for managing striped storage volumes in a data storage system.

BACKGROUND

Distributed storage systems are implemented using a plurality of storage devices (e.g., storage arrays). The storage devices can reside locally in a given storage node, or the storage devices can reside on multiple storage nodes that are networked connected via a storage fabric. Various techniques are utilized in distributed data storage systems to provide resiliency and error correction to protect stored data in the event of failures of storage devices or storage nodes. For example, such techniques include erasure coding techniques and RAID (Redundant Array of Independent Drives) techniques. In general, RAID is a technology that is utilized to enhance the performance and reliability of data storage. There are various RAID levels which implement different combinations of techniques such as data mirroring, data striping, parity, etc., to provide fault tolerance and allow missing data to be recovered or otherwise reconstructed in the event of a failure of a storage device such as a hard disk drive (HDD), a solid-state drive (SSD), etc.

Over time, a storage volume such as a striped RAID storage volume can become fragmented to a level which begins to have an adverse impact on performance of the storage system. For example, one way to achieve a lower average input/output (IO) overhead for writing to a RAID 6 volume is to perform as many full stripe writes as possible, which becomes increasingly difficult when the free capacity of the striped array runs low or becomes highly fragmented, resulting in a smaller number of empty full stripes to perform full stripe writes. To enhance the storage performance, a stripe defragmentation process can be performed to defragment the striped storage volume and generate empty stripes. However, defragmenting a striped storage volume such as a parity-based RAID storage volume can result in degraded system performance given that defragmentation is extremely IO intensive especially in a shared storage system where a storage control system needs to allocate shared resources (e.g., cache, IO channels, RAID controller activity) to accommodate the intensive IO load generated as a result of the read and write operations of the defragmentation process. Moreover, for RAID storage volumes, degraded storage system performance can result from the operations associated with recomputing parity stripes and performing internal metadata updates on multiple levels due to failed storage devices.

SUMMARY

Exemplary embodiments of the disclosure include techniques for defragmenting or rebuilding stripes of data stored on storage devices of a storage system. For example, an exemplary embodiment includes a method that is performed by at least one processing device of the storage system. The method comprises maintaining stripe metadata corresponding to a plurality of stripes of data stored on a plurality of storage devices of the storage system. The stripe metadata comprises at least a first timestamp, a second timestamp and a read count for each stripe. The method further comprises obtaining a read request associated with a given stripe of the plurality of stripes, the read request having an associated timestamp, and determining, based at least in part on the obtained read request, whether or not a time period for the given stripe has been exceeded. The method further comprises updating the stripe metadata corresponding to the given stripe based at least in part on the determination of whether or not the time period for the given stripe has been exceeded and the associated timestamp of the read request and determining a read access frequency of the given stripe based at least in part on the read count, the first timestamp and the second timestamp of the updated stripe metadata for the given stripe. The method further comprises performing at least one of a defragmentation process and a rebuild process based at least in part on the determined read access frequency of the given stripe.

Other embodiments of the disclosure include, without limitation, methods, systems, and articles of manufacture comprising processor-readable storage media, which are configured for defragmenting a striped storage volume in an array of data storage devices of a storage system.

BRIEF DESCRIPTION OF THE DRAWINGS

FIG. 1 schematically illustrates an information processing system comprising a storage system which is configured according to an exemplary embodiment of the disclosure.

FIG. 2 schematically illustrates a storage system which comprises a storage control system that is configured according to an exemplary embodiment of the disclosure.

FIGS. 3A and 3B schematically illustrate a striped logical storage volume having a plurality of stripe sets, wherein each stripe set is associated with a different stripe type to store blocks of a respective block size, according to an exemplary embodiment of the disclosure.

DETAILED DESCRIPTION

Figure 4:
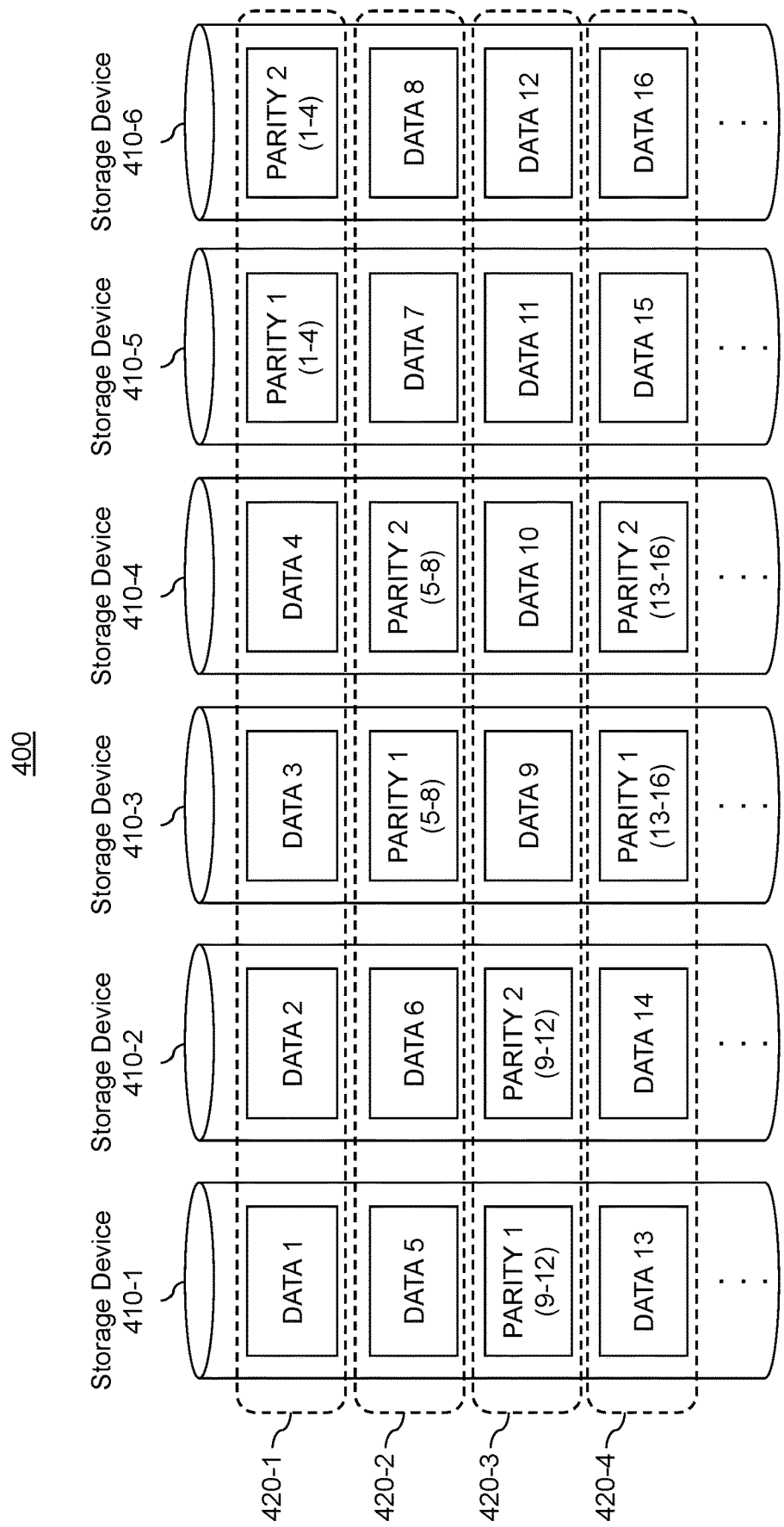
FIG. 4 schematically illustrates a RAID 6 configuration which can be implemented in the data storage systems of FIGS. 1 and 2, according to an exemplary embodiment of the disclosure.

Exemplary embodiments of the disclosure will now be discussed in further detail with regard to systems and methods for defragmenting or recovering a striped storage volume in an array of data storage devices of a storage system, according to an exemplary embodiment of the disclosure. For purposes of illustration, exemplary embodiments will be described herein with reference to exemplary information processing systems which implement data processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

FIG. 1 schematically illustrates an information processing system comprising a storage system which is configured to defragment a striped storage volume in an array of data storage devices of the storage system, according to an exemplary embodiment of the disclosure. In particular, FIG. 1 schematically illustrates an information processing system 100 which comprises one or more host systems 110-1, 110-2, ... 110-H (collectively, host systems 110), one or more management server nodes 115, a communications network 120, and a data storage system 130. The data storage system 130 comprises one or more storage arrays 140-1, 140-2, ..., 140-A (collectively, storage arrays 140). As further illustrated in FIG. 1, the storage array 140-1 comprises a storage control system 150, and a plurality of storage devices 160-1, 160-2, ..., 160-S (collectively, storage devices 160). The storage control system 150 comprises a stripe defragmentation control system 152 and a stripe rebuild control system 154. Stripe defragmentation control system 152 implements methods that are configured to defragment striped storage volumes that are stored in the storage devices 160 in one or more of the storage arrays 140 using techniques as discussed in further detail below. Stripe rebuild control system 154 implements methods that are configured to rebuild striped storage volumes that are stored in the storage devices 160 in one or more of the storage arrays 140 in the event of a storage device failure using techniques as discussed in further detail below. The storage control system 150 implements other functional components and modules to provide various functions as will be discussed in further detail below, for example, in conjunction with the exemplary embodiment of FIG. 2.

The host systems 110 comprise physical nodes and/or virtual nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). The host systems 110 can include one or more physical server nodes and/or virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in one or more of the storage arrays 140 and (ii) read requests to access data that is stored in one or more of the storage arrays 140.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly construed and not viewed as being limited to storage systems of any particular type or types. In some embodiments, the data storage system 130 comprises a distributed data storage system comprising a cluster of the storage arrays 140-1, 140-2, ..., 140-A, wherein each storage array 140 comprises the same or similar components as the storage array 140-1 shown in FIG. 1. In such embodiments, the addition of more storage arrays allows for scale-out in both performance and capacity of the data storage system 130. In other embodiments, the data storage system 130 may comprise a single storage array (e.g., storage array 140-1), wherein scale-up of capacity can be realized by adding additional storage devices to the storage array. It is to be noted that the storage array 140-1 and its associated storage devices 160 are an example of what is more generally referred to herein as a "storage system."

In some embodiments, each storage array 140 (or storage system) comprises a physical server machine or storage appliance comprising processors and other hardware resources that execute software and firmware to implement the functionality of the storage control system 150, and wherein the storage devices 160 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). In some embodiments, the storage devices 160 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices.

These and various combinations of multiple different types of storage devices 160 may be implemented in each storage array 140. In this regard, the term "storage device" as used herein is intended to be broadly construed, so as to encompass, for example, SSDs, HDDs, flash drives, hybrid drives or other types of storage media. The storage control system 150 communicates with the data storage devices 160 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc.

The management server nodes 115 implement application programming interfaces (APIs) to enable manual, automated, and/or semi-automated configuration, provisioning, and monitoring of the data storage system 130 and associated storage arrays 140. In some embodiments, the management server nodes 115 comprise stand-alone dedicated management server nodes, which may comprise physical and/or virtual servers that are configured to control operations of the data storage system 130.

The host systems 110 and management server nodes 115 communicate with the data storage system 130 over the communications network 120. While the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement IO channels and support storage network connectivity. Numerous alternative networking arrangements are possible in a given embodiment, as will be appreciated by those skilled in the art.

In some embodiments, the storage arrays 140 of the data storage system 130 are interconnected (via the communications network 120) in a full-mesh network, wherein back-end interconnectivity between the storage control systems 150 of the storage arrays 140 is achieved using, e.g., a redundant high-speed InfiniBand fabric (e.g., 40 Gbps InfiniBand). In some embodiments, the storage arrays 140 utilize remote procedure calls (RPC) for control messages and remote direct memory access (RDMA) for moving data blocks. In some embodiments, the host systems 110 and management server nodes 115 communicate with the storage arrays 140 in a SAN configuration using Ethernet iSCSI and/or Fibre Channel connectivity protocols over the communications network 120.

On each storage array 140, the storage control system 150 comprises a combination of hardware, firmware, and software resources, which are configured to perform various functions including, but not limited to, (i) managing and executing data access requests issued by the host systems 110, (ii) performing various data management and storage services, and (iii) controlling network communication and connectivity, etc. In embodiments where the data storage system 130 comprises a cluster of multiple storage arrays 140, the storage control systems 150 of the storage array cluster will communicate in a cooperative manner to process each data access request received from the host systems 110.

FIG. 2 schematically illustrates a storage system which comprises a storage control system that is configured to defragment or rebuild a striped storage volume in an array of data storage devices of the storage system, according to an exemplary embodiment of the disclosure. More specifically, FIG. 2 schematically illustrates an exemplary framework of a storage array 200 which can be implemented for the storage arrays 140 in the data storage system 130 of FIG. 1. The storage array 200 (alternatively referred to as storage system 200) comprises a storage control system 210 which comprises a front-end IO flow monitoring and control module 220, a data compression/decompression module 230, a RAID control module 240, a stripe defragmentation control system 250, a stripe rebuild control system 254 and a stripe metadata management module 260. The stripe defragmentation control system 250 comprises a stripe type conversion control module 252. The stripe rebuild control system 254 comprises a stripe rebuild control module 256. The stripe metadata management module 260 generates and manages data structures comprising stripe metadata 262 for the striped storage volumes that are stored in the storage array 200.

The storage array 200 further comprises an SSD drive array enclosure 270 comprising a plurality of solid-state drives 270-1, 270-2, . . . , 270-S (collectively referred to as SSD array 270, or more generally array of storage devices 270). The SSD array 270 can be coupled to the storage control system 210 using redundant interconnects that are implemented using any suitable standard interface such as SAS, SATA, PCI-Express, etc. In some embodiments, each solid-state drive 270-1, 270-2, . . . , 270-S comprises a plurality of flash memory chips, which are typically organized in an interleaved manner and accessed by the storage controller using different dedicated channels to enable parallel access to data. For example, an SSD controller can be connected to 4 flash memory chips using four parallel channels, whereby data transfer and read or write operations can be performed on different flash memory chips simultaneously. Each flash memory chip includes a plurality of dies which share a multiplexed interface (e.g., serial IO bus). Each die comprises an array of memory cells that are grouped into a plurality of blocks, wherein each block comprises a plurality of pages. Typically, the blocks of each die are divided/organized into multiple planes (e.g., 2 or 4 planes), wherein each plane comprises a portion of the total number blocks. By way of example, each die can have a total of 4096 blocks organized among 2 planes of 2048 blocks. The dies can operate independently and perform operations involving one or two planes. Furthermore, in some embodiments, each physical block comprises a same number of pages (e.g., typically 64, 128, or 256 pages). Each page has a same page size, wherein common page sizes include 2 KB, 4 KB, 8 KB, or 16 KB. In some embodiments, each die further comprises registers (e.g., data register, cache register), wherein each register has a same size as the page size of the pages. In addition, each page can include a dedicated region to store metadata such as identification and error-detection information.

As is known in the art, solid-state storage media such as NAND flash media allows data to be written or read on a page level, but does not allow existing data to be overwritten. In particular, while data can be written to an empty page, a page with existing data cannot be overwritten. Instead, a given block of flash memory must first be erased (E) before any new pages can be written (programmed P) to the given block. By way of example, if given programmed page of data of a given block has to be modified, the following process must be performed: (i) the page data of the entire block (i.e., valid pages of the block) is read into a temporary memory (e.g., a block located in over-provisioned capacity); (ii) an erase operation is performed to delete the existing data of the given block; (iii) a programming operation is performed to rewrite the previous data of the block plus the updated page content to the block, thereby resulting in the new block contents being programmed to the same block address. Furthermore, with NAND flash memory, free space can be created by reclaiming blocks of flash memory which include pages with stale (invalid) data using a "garbage collection" or defragmentation process.

The front-end IO flow monitoring and control module 220 (alternatively referred to herein as choker control module 220) comprises an intelligent "choker" control module which implements a dynamic flow-control mechanism that operates to adjust the system load in a way that ensures that the maximum TO performance can be achieved with the storage system 200 while guaranteeing a reasonable latency (within defined limits). The choker control module 220 is implemented at the frontend of the storage system 200 where TO requests enter the storage system 200. In some embodiments, the front-end IO flow monitoring and control module 220 maintains at least two latency thresholds, including a low_latency_threshold and a high_latency_threshold, to determine whether to increase or decrease a "choker size." For example, in an illustrative embodiment, the high_latency_threshold may be, e.g., 1000 microseconds, and the low_latency_threshold may be, e.g., 700 microseconds.

The front-end IO flow monitoring and control module 220 monitors and queues incoming IO requests, measures the end-to-end IO latency, and then adjusts a "choker size" based on the measured IO latency compared to the low_latency_threshold and the high_latency_threshold values. For example, the "choker size" may be a threshold number of pages, sectors, or blocks, a threshold number of bytes, or a threshold number of IO requests that may be processed concurrently by the storage system. The choker control module 220 controls the number of concurrent IO requests the storage system 200 will handle. This control mechanism ensures that the storage system 200 will perform within target operating range based on the low and high latency threshold values, and prevent uncontrolled latency growth. When the maximum number of IO requests is reached, new incoming IOs are placed in queue for processing, or may be rejected (e.g., returning BUSY to the host).

The data compression and decompression module 230 comprises a data compression module that is configured to support in-line compression of data that is written to the array of storage devices 270, and a data decompression module that is configured to support in-line decompression of compressed data that is read from the array of storage devices 270. In particular, the data compression module implements one or more types of data compression techniques to compress IO write data that is provided with an IO write request. In some embodiments, for a write IO operation, the associated IO write data is divided into blocks, and each block is separately compressed by the data compression module. In some embodiments, the compressed data blocks can be grouped into blocks with block sizes that are less than or equal to an "allocation unit size" before being written to the array of storage devices 270.

The data compression module can implement one more data compression techniques including, but not limited to, Lempel-Ziv (LZ) compression, Lempel-Ziv-Welch (LZW) compression, other variants of LZ compression, Huffman encoding, run-length encoding, etc., and other types of data compression techniques which are suitable for the expected types of data that are to be stored for a given application. The data decompression module is configured to decompress compressed data that is read from the array of storage devices 270 in response to IO read requests. In particular, when compressed data is accessed from the array of storage devices 270, the compressed data is input to the data decompression module and decompressed using a decompression process which corresponds to the process that was used to compress the data. The decompressed data is then returned in response to the IO read request.

In some embodiments, the data compression and decompression module 230 can implement a compressibility determination module that is configured to determine the "compressibility" of data that is to be written to the array of storage devices 270. With regard to a given block of IO write data, the term "compressibility" as used herein broadly refers to (i) a level of data compression that can be obtained for the given block of IO write data or (ii) a degree to which a size of the given block of IO write data can be reduced by data compression. The compressibility determination can be implemented based on the understanding that not all data is compressible. For example, when data compression is performed on data that is essentially incompressible, the size of the resulting "compressed" data may be the same or greater than the size of the original, non-compressed data. For example, incompressible data can include pre-compressed content (e.g., compressed audio and video), or pure random data. In such instance, the data that is deemed to be incompressible can be stored in its originally received form (which may or may not already be compressed or otherwise encoded).

The RAID control module 240 implements methods that are configured to distribute, organize, and manage data across multiple storage devices in the array of storage devices 270 to implement a RAID array according to a given RAID level configuration (e.g., RAID 1, RAID 5, RAID 6, etc.). In some embodiments, the RAID control module 240 is configured to manage a striped logical storage volume (e.g., striped RAID volume) across a plurality of local storage devices (solid-state devices 270) of the storage system 200, and possibly other local storage devices of one or more storage systems within a given cluster (e.g., storage devices of different storage arrays 140 of the data storage system 130 of FIG. 1). In such instance, the RAID control module 240 cooperates with the RAID control modules of other storage arrays within a cluster to implement a RAID array which comprises a plurality of storage devices (e.g., solid-state drives 270) across different storage arrays. In some embodiments, the RAID control module 240 comprises a software module of the storage control system 210, in which the RAID functionality is executed using the operating system and existing hardware of the host storage system 200.

The RAID control module 240 is configured to control and manage the organization of data in a given RAID array using RAID storage techniques such as striping, mirroring, parity, and combinations thereof, depending on the given RAID level configuration. In particular, the RAID control module 240 implements data striping methods that are configured to support RAID schemes which implement data striping techniques to distribute data over a plurality of storage devices. In particular, the data striping methods are configured to divide data into resiliency units called "stripes" and divide the stripes into equal-sized data blocks, referred to as "strips," wherein the strips are stored on different storage devices (e.g., different solid-state drives 270) within the RAID array. In addition, the RAID control module 240 implements parity computing methods that are configured to support parity-based RAID schemes. The parity computing methods are configured to compute parity data (for, e.g., data stripes) using one or more types of parity functions (e.g., eXclusive OR (XOR) function, etc.). The types of parity functions that are implemented will depend on the RAID level configurations that are supported by the RAID control module 240. The RAID control module 240 implements methods for rebuilding of spare capacity in the event of one or more failures of a given RAID array (e.g., failure of a single solid-state drive in the given RAID array, or failure of a given storage array which includes a solid-state drive that is implemented in the given RAID array, etc.).

The RAID control module 240 is configured to implement different types of RAID levels (e.g., RAID 5, RAID 6, etc.) which utilize a combination of block level data striping and distributed parity techniques to provide resiliency and error correction in the event of a failure (e.g., failure of a given storage device within a RAID array, the failure of a storage system node which hosts a storage device within the RAID array, etc.). In accordance with exemplary embodiments of the disclosure, the RAID control module 240 generates and manages one or more striped logical volumes that are associated with RAID configurations. The RAID control module 240 defines a plurality of different "stripe types" for stripes that are stored in a striped logical volume. The term "stripe type" as used herein denotes a block size (or stripe size, segment size, etc.) of a stripe having the given stripe type. More specifically, in some embodiments, stripes having different stripe types are equal-sized stripes, but wherein each stripe type is structured to store blocks of a specific size. In other words, stripes having the same stripe type are formed of blocks that are the same size, while different types of stripes are formed of blocks having different sizes. It is to be understood that the term "stripe" as used herein refers to suitable type of storage unit, including, but not limited to, RAID stripes. In this regard, although exemplary embodiments are discussed herein in the context of RAID arrays and RAID stripes, it should be understood that the exemplary embodiments for defragmenting striped logical storage volumes are not limited to any specific type of storage technology.

FIGS. 3A and 3B schematically illustrate a striped logical storage volume having a plurality of stripe sets, wherein each stripe set is associated with a different stripe type to store blocks of a respective block size, according to an exemplary embodiment of the disclosure. In particular, FIG. 3A schematically illustrates a striped logical storage volume 300 comprising a plurality of different sets of stripes 302-1, 302-2 and 302-3 (alternatively referred to as "stripe sets" 302-1, 302-2 and 302-3, collectively as stripe sets 302 or individually as a stripe set 302). In some embodiments, the striped logical storage volume 300 comprises a logical RAID volume. Each stripe set 302-1, 302-2, and 302-3 comprises stripes that are formed of blocks having the same size. For example, the first stripe set 302-1 comprises one or more stripes that are assigned a first stripe type (e.g., STRIPE_TYPE_16 KB) wherein the stripes within the first stripe set 302-1 are formed of blocks of a first size (e.g., 16 KB). The second stripe set 302-2 comprises one or more stripes that are assigned a second stripe type (e.g., STRIPE_TYPE_8 KB) wherein the stripes within the second stripe set 302-2 are formed of blocks of a second size (e.g., 8 KB). The third stripe set 302-3 comprises one or more stripes that are assigned a third stripe type (e.g., STRIPE_TYPE_4 KB) wherein the stripes within the third stripe set 302-3 are formed of blocks of a third size (e.g., 4 KB).

In other embodiments, although not specifically shown in FIG. 3A, a striped logical storage volume 300 can include other stripe sets 302 that are assigned different stripe types. For example, the striped logical storage volume 300 can have a fourth stripe set which comprises one or more stripes that are assigned a fourth stripe type (e.g., STRIPE_TYPE_64 KB) wherein the stripes within the fourth stripe set are formed of blocks of a fourth size (e.g., 64 KB). In addition, the striped logical storage volume 300 can have a fifth stripe set which comprises one or more stripes that are assigned a fifth stripe type (e.g., STRIPE_TYPE_2 KB) wherein the stripes within the fifth stripe set are formed of blocks of a fifth size (e.g., 2 KB). It is to be understood that the number of different stripe types assigned to stripe sets will vary depending on the desired granularity of the storage system, the types of data or files (e.g., text files, pictures, video, etc.) expected to be stored in the storage system, and other factors as is understood by those of ordinary skill in the art. Moreover, while the different block sizes can be defined based on powers of 2, it is to be understood that exemplary embodiments can include other block sizes, e.g., 3 KB, or other suitable sizes.

The stripe metadata management module 260 generates and manages the stripe metadata 262 for the different stripe sets 302, e.g., stripe sets 302-1, 302-2, and 302-3. For example, the stripe metadata 262 for each stripe set 302 can include, e.g., identifiers for the stripes within the stripe set 302 that are assigned the same stripe type, a block count regarding a number of free blocks or number of utilized blocks within each stripe in the stripe set 302, metadata regarding a total amount of free storage space within all stripes in the stripe set 302, and a total amount of used space within all stripes in the stripe set 302. Such metadata can be utilized, for example, to determine which stripes have sufficient free space to store data associated with an IO write request, to determine whether or not the storage capacities of the different stripe sets 302 are sufficiently balanced or unbalanced, etc. In illustrative embodiments, the stripe metadata 262 for each stripe may include a read access frequency. The term "read access frequency" as used herein is intended to be broadly construed, and in some embodiments is expressed in terms of a stripe temperature index (STI) that indicates an average number of recent read quests for that stripe in a given period of time, although other measures could be used.

In some embodiments, while different types of stripes have different block sizes, all stripes are equal-sized stripes irrespective of the assigned stripe types. For example, FIG. 3B schematically illustrates different stripes 310, 320, and 330, which are included in respective stripe sets 302-1, 302-2, and 302-3. Each stripe 310, 320, and 330 has the same stripe size(s) despite having different block sizes corresponding the assigned stripe types. For example, the first stripe 310 with the assigned stripe type of STRIPE_TYPE_16 KB is configured to store N blocks of size 16 KB, the second stripe 320 with the assigned stripe type of STRIPE_TYPE_8 KB is configured to store 2N blocks of size 8 KB, and the third stripe 330 with the assigned stripe type STRIPE_TYPE_4 KB is configured to store 4N blocks of size 4 KB.

In some embodiments, when the striped logical storage volume 300 is initially configured, the storage control system 210 (e.g., the RAID control module 240) divides and allocates the physical storage capacity (e.g., different storage devices in RAID array) associated with the striped logical storage volume 300 among the different stripe sets 302 so that each stripe set 302 is initially configured to have an allocated amount of available stripe capacity with the associated stripe type. For example, assume a RAID array that is logically configured to have plurality of columns (K) and a plurality of rows (N), wherein each column K represents a different solid-state drive and k=24 with 22 columns to store data strips and 2 columns to store two different parity strips (e.g., P and Q) for a RAID 6 configuration.

Furthermore, assuming 30 rows are allocated for a first set of stripes with an assigned stripe type 16 KB, then on each drive (i.e., column) (except for the two parity columns) the first set of stripes would have a total amount of available data blocks (16 KB each) equal to 22×30=660 data blocks, providing a total storage capacity of 660×16 KB. Next, assuming there are 60 rows allocated for a second set of stripes with an assigned stripe type 8 KB, then on each drive (i.e., column) (except of the two parity columns) the second set of stripes would have a total amount of available data blocks (8 KB each) equal to 22×60=1320 data blocks, providing a total storage capacity of 1320×8 KB. Moreover, assuming there are 120 rows allocated for a third set of stripes with an assigned stripe type 4 KB, then on each drive (i.e., column) (except of the two parity columns) the third set of stripes would have a total amount of available data blocks (4 KB each) equal to 22×120=2640 data blocks, providing a total storage capacity of 2640×4 KB.

For example, FIG. 4 schematically illustrates an example RAID 6 configuration 400 which can be implemented in the data storage systems of FIGS. 1 and 2, according to an exemplary embodiment of the disclosure. In particular, the RAID 6 configuration 400 comprises six storage devices 410-1, 410-2, 410-3, 410-4, 410-5, and 410-6 (collectively, storage devices 410). In some embodiments, in the context of the exemplary embodiment of FIG. 2, each storage device 410-1, 410-2, 410-3, 410-4, 410-5, and 410-6 comprises a different solid-state drive within the SSD array 270 of the storage array 200. In other embodiments, each storage device 410-1, 410-2, 410-3, 410-4, 410-5, and 410-6 comprises a different solid-state drive 270 within two or more storage arrays within a cluster. The RAID 6 configuration 400 can be implemented to protect user data and some system metadata. The RAID 6 configuration 400 is organized in grids data blocks, with N rows and K columns. As noted above, each column is a separate physical solid-state drive, where 4 data columns are used to store data strips, and two columns are used to store associated parity data strips, e.g., PQ parity data, wherein the parity data strips P are computed, for example, by performing logical XOR operations across the data columns, and wherein parity data strips Q are computed by encoding diagonals in the matrix of stripes.

In the exemplary embodiment of FIG. 4, for ease of illustration, four individual RAID 6 stripes 420-1, 420-2, 420-3, and 420-4 are shown, wherein each RAID stripe 420-1, 420-2, 420-3, and 420-4 comprises 4 data strips and 2 parity strips. In particular, the RAID stripe 420-1 comprises four data strips DATA 1, DATA 2, DATA 3, and DATA 4, and two independent parity strips PARITY 1 and PARITY 2 for the data strips DATA (1-4). The RAID stripe 420-2 comprises four data strips DATA 5, DATA 6, DATA 7, and DATA 8, and two independent parity strips PARITY 1 and PARITY 2 for the data strips DATA (5-8). The RAID stripe 420-3 comprises four data strips DATA 9, DATA 10, DATA 11, and DATA 12, and two independent parity strips PARITY 1 and PARITY 2 for the data strips DATA (9-12). The RAID stripe 420-4 comprises four data strips DATA 13, DATA 14, DATA 15, and DATA 16, and two independent parity strips PARITY 1 and PARITY 2 for the data strips DATA (13-16).

While FIG. 4 illustrates an exemplary RAID 6 layout for the data blocks and parity data blocks, different RAID 6 layout schemes can be implemented which specify different orders and locations in which the constituent data blocks (strips) and associated parity data blocks for the data blocks (stripes) are written to the storage devices 410-1, 410-2, 410-3, 410-4, 410-5, and 410-6 within the RAID 6 configuration 400. The RAID 6 configuration 400 provide resiliency and data protection in the event a maximum of two failures of the storage devices.

In the exemplary embodiment of FIG. 4, assuming that the number of data blocks N for the stripe 310 in FIG. 3B is N=4, each individual RAID stripe 420-1, 420-2, 420-3, and 420-4 would represent a separate stripe in the first stripe set 302-1 (FIG. 3A). Assuming that the number of data blocks 2N for the stripe 320 in FIG. 3B is 2N=8, the two RAID stripes 420-1 and 420-2 would represent one stripe in the second stripe set 302-2 (FIG. 3A), and the two RAID stripes 420-3 and 420-4 would represent another stripe in the second stripe set 302-2. Further, assuming that the number of data blocks 4N for the stripe 330 in FIG. 3B is 4N=16, the four RAID stripes 420-1, 420-2, 420-3 and 420-4 would collectively represent a single stripe in the third stripe set 302-3 (FIG. 3A).

As noted above, the storage system 200 implements an efficient data reduction method by utilizing the data compression and decompression module 230 to compress incoming data pages and stores the compressed data pages in one or more stripes (e.g., RAID stripes) of a striped storage volume (e.g., RAID 6 storage volume) based on the size of the compressed data pages. For example, if a data page is compressed to 3 KB and the stripe type with the closest block size to 3 KB is 4 KB then it will be stored in a stripe of type STRIPE_TYPE_4 KB. The system divides the storage capacity to the different types of stripes at initialization, and the stripes are filled according to the compressed size of the written data pages. This poses a problem in instances where, e.g., all data pages are compressed to 15 KB and are therefore stored in stripes of type STRIPE_TYPE_16 KB. At some point, all stripes within the stripe set having the assigned stripe type STRIPE_TYPE_16 KB will become full such that the storage system will not be able to write any new data despite the fact that there may be available storage capacity allocated to data stripes in other stripes sets with different stripe types.

The stripe defragmentation control system 250 is configured to balance the available capacity of the different stripe sets of different stripe types by performing defragmentation operations to generate empty stripes of the corresponding type. The stripe defragmentation control system 250 performs a background defragmentation process that is responsible to ensure that each stripe type has a proportional amount of available capacity (e.g., balance available capacity on stripe counts for the different stripe types). When the stripes (e.g., RAID stripes) of a given storage volume (e.g., RAID 6 storage volume) are fragmented and there are no empty stripes of a given stripe type, the system performance can be significantly degraded since a defragmentation operation increases write amplification and requires additional IO bandwidth on the array of storage devices to perform the defragmentation operations. The performance impact is especially increased and noticeable during peak hours of increased IO activity when the storage system is under a heavy IO load. On the other hand, the storage system is not always 100% loaded. It has peak hours and off-peak hours (e.g., at night) in which the system resources are not 100% utilized and are essentially idle.

The stripe type conversion control module 252 monitors the available capacity of the different stripe sets 302 of different stripe types. Whenever there is a capacity disbalance among the stripe sets 302, the stripe type conversion control module 252 can select one or more available stripes of the stripe type that has additional capacity and convert the selected available stripes to stripes of a stripe type that has a shortage of available capacity. The stripe type conversion control module 252 operates at any time during peak hours when the storage system is fully or highly utilized, or even during off peak hours when the storage system IO load is light, to convert available stripes of the stripe type that has additional capacity to stripes of the stripe type that has a shortage of available capacity. Since the stripe type conversion process does not require a complicated defragmentation operation involving excessing storage device IOs, parity recalculations, internal metadata updates on multiple levels, the stripe conversion process implemented by the stripe type conversion control module 252 does not adversely impact system performance in a significant manner.

The stripe rebuild control system 254 is configured to manage rebuild operations for stripes in the event of a failure in one or more of the storage devices storing portions of those stripes. For example, stripe rebuild control system 254 is configured to manage rebuild operations for stripes either as a background process or as an on-demand process, e.g., in the case where an IO read operation has requested a data page that was stored on a failed storage device. The RAID 6 parity protection scheme allows the stripe rebuild control system 254 to recover data on a single storage device failure, also referred to as a single degraded failure, or double storage device failure, also referred to as a double degraded failure. In some embodiments, after the failure of one or more storage devices, the stripe rebuild control system 254 is configured to execute a stripe rebuild background process that traverses the stripes in sequential order, e.g., according to the stripe index, to recover the data stored on the failed storage devices in each stripe.

After a single storage device failure, in order to recover a data page that was stored on the failed storage device, the stripe rebuild control system 254 is configured to read the rest of the corresponding row in the corresponding stripe, e.g., the row in the stripe where the data page was stored.

After a double storage device failure, in order to recover a particular data page that was stored on the failed storage device, the stripe rebuild control system 254 is configured to read a zigzag pattern of most of the stripe (N*(K+2) blocks). This is because the recovery of the particular data page is dependent on the recovery of other data pages that may also reside on the failed storage devices. For example, recovery of the particular data page may rely on those other data pages being recovered prior to recovering the particular data page based on those other data pages.

When a host system 110 issues an IO read request for data pages residing on failed storage devices in stripes that have not yet been recovered, e.g., by the background rebuild process, also referred to as a "degraded read" request, the storage system must recover the corresponding stripe on-demand in order to reply with the correct data page to the host system 110. Such an on-demand recovery may significantly increase the IO read latency for such degraded read operations, e.g., due to the long recovery time. This degraded read process adds more load and latency to the storage system and may cause performance degradation to the storage system as a whole. In addition, in some cases, the storage system will incur this latency penalty until the rebuild process is completed. For example, the more often data pages stored on failed storage devices are requested to be read while the stripe remains degraded, the greater the performance and latency impact of the additional IO read latency on the operation of the storage system.

In illustrative embodiments, rebuild and defragmentation functionality is disclosed that improves the IO read latency for degraded read operations. With reference again to FIG. 2, for example, stripe defragmentation control system 250 and stripe rebuild control system 254 may each be provided with functionality that takes into account a temperature associated with each stripe, e.g., the read activity of data pages stored on that stripe. For example, stripes comprising "hot" data pages, e.g., those that are requested more often and therefore have a higher probability of being requested again, may be targeted for recovery by the stripe rebuild control system 254 before other pages that have a lower temperature, e.g., pages having a lower probability of being requested. By targeting stripes containing "hot" pages first, the recovery time during IO processing for the most utilized data pages may be reduced and the IO read latency and overall system performance may be improved.

In addition, the defragmentation process performed by stripe defragmentation control system 250 may comprise defragmentation functionality that prefers the selection of a destination stripe that has a similar temperature to the stripe being relocated such that, e.g., stripes comprising "hot" data pages will be relocated to destination stripes that also comprise "hot" data pages while stripes comprising "cold" data pages, e.g., data pages that are not accessed as often, will be relocated to destination stripes that also comprise "cold" data pages, and so on.

Figure 5:
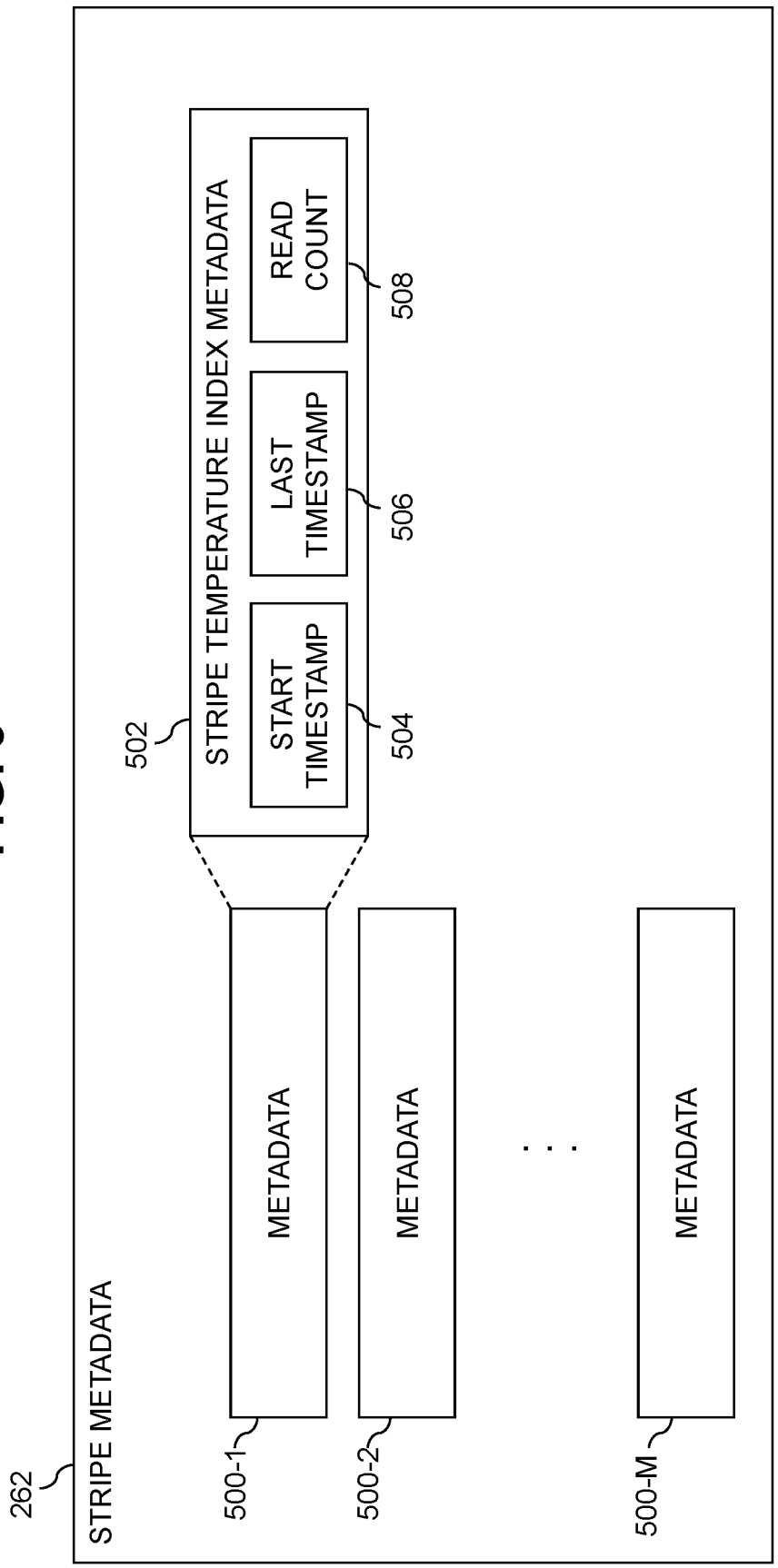
FIG. 5 schematically illustrates stripe metadata comprising stripe temperature index metadata, according to an exemplary embodiment of the disclosure.

As part of the above described rebuild and defragmentation functionality, the stripe metadata 262 comprises additional information about the temperature of each stripe. For example, with reference to FIG. 5, the stripe metadata 262 comprises metadata 500-1, 500-2 . . . 500-M that each correspond to a particular stripe, also collectively and individually referred to herein as metadata 500. The metadata 500 for each stripe comprises STI metadata 502 that stores information associated with a temperature for that stripe. The STI metadata 502 is utilized to determine an STI for each stripe which indicates how frequently data pages within that stripe are requested as part of IO read operations during a particular interval of time.

The stripe type conversion control module 252 of the stripe defragmentation control system 250 is configured to utilize this STI when determining a destination stripe during the defragmentation process. For example, in addition to determining which stripes have enough space to store the data pages that are being relocated as part of the defragmentation of a stripe, the stripe type conversion control module 252 may also determine which of the stripes that have enough space also have a similar temperature to the stripe comprising the data pages that are being relocated, e.g., based on their respective STIs.

A stripe rebuild control module 256 of the stripe rebuild control system 254 is also configured to utilize the stripe temperature index when determining which stripes to rebuild first in the event of a storage device failure. For example, the stripe rebuild control module 256 may prioritize rebuilding those stripes that have a higher temperature over rebuilding stripes having a lower temperature based on their respective STIs. In this manner, the most accessed stripes, and therefore the stripes that are also most likely to be accessed in the future will be rebuilt first, thereby reducing the read latency on the system while it recovers from the storage device failure.

With reference again to FIG. 5, the STI metadata 502 for a given stripe comprises information about recent read requests for that stripe. For example, the STI metadata 502 comprises a start timestamp 504, a last timestamp 506 and a read count 508.

The start timestamp 504 indicates the starting time of the measurement interval. In illustrative embodiments, the start timestamp 504 stores a timestamp of the first read request for that stripe in the current interval. As will be described in more detail below, the interval may be restarted in a case where no read requests are issued for the stripe for a predetermined amount of time. The start timestamp 504 is also referred to herein as a first timestamp.

The last timestamp 506 indicates the timestamp of the last read request for the measurement interval of that stripe, e.g., the most recent read request in some embodiments. The last timestamp 506 is also referred to herein as a second timestamp.

The read count 508 indicates the number of read requests for that stripe that have occurred in the interval between the start timestamp 504 and the last timestamp 506.

A predetermined time period, also referred to herein as a cold interval, is utilized to determine when the interval between the start and last timestamps needs to be reset, e.g., according to equation (1) below:

$$\text{reset} = \text{last timestamp} - \text{start timestamp} > \text{cold interval} \quad (1)$$

For example, if no read requests have arrived for a stripe within the cold interval duration, e.g., the difference between the last timestamp 506 and the start timestamp 504 is greater than the cold interval, the start timestamp 504, last timestamp 506 and read count 508 are reset. The reset may comprise setting the start timestamp 504, last timestamp 506 and read count 508 to predetermined values, e.g., 0, or any other value. In some embodiments, the cold interval is not actively monitored and the reset will be triggered by the next read operation for that stripe. In such a case, the start timestamp 504 and last timestamp 506 may not be reset. Instead, the start timestamp 504 and last timestamp 506 may be updated to the timestamp of that read operation. In some embodiments, the predetermined cold interval may be set to, e.g., 10 seconds, 10 minutes or any other amount of time.

Figure 6:
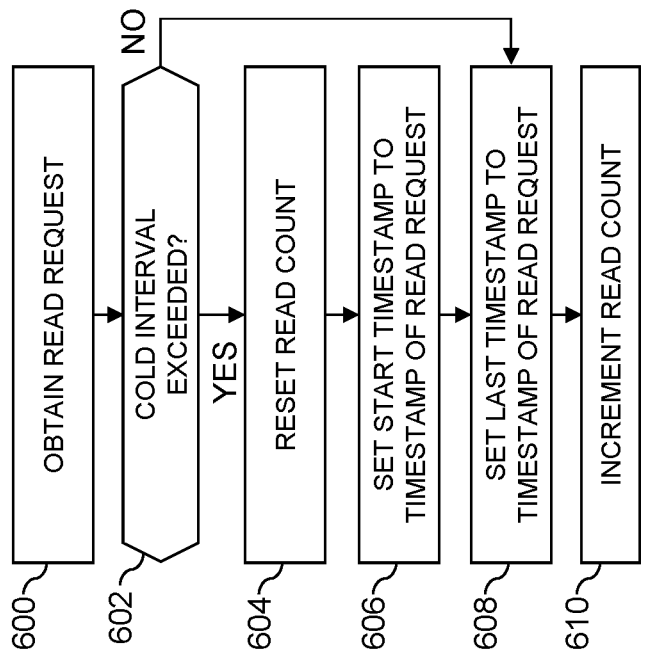
FIG. 6 is a flow diagram of a process for updating the stripe temperature index metadata of FIG. 5 based on an obtained read request, according to an exemplary embodiment of the disclosure.

With reference now to FIG. 6, a process performed by stripe metadata management module 260 for populating the STI metadata 502 for a given stripe will now be described.

At step 600, a read request is obtained by the storage control system 210 for a data page stored on the given stripe.

At step 602, the stripe metadata management module 260 determines whether or not the cold interval has been exceeded. If the cold interval has been exceeded, the process proceeds to step 604. If the cold interval has not been exceeded, the process proceeds to step 608. In some embodiments, the start timestamp 504 and last timestamp 506 may be initialized to have a difference greater than the cold interval such that if this is the first read request for this stripe since system start, the cold interval may be considered exceeded and the process proceeds to step 604.

At step 604, the stripe metadata management module 260 resets the read count, e.g., to 0. In alternative embodiments, the read count may be reset to or incremented to any other values. In some embodiments, the start timestamp 504, last timestamp 506, or both may also be reset to a predetermined value.

At step 606, the stripe metadata management module 260 updates the start timestamp 504 with the timestamp of the read request.

At step 608, the stripe metadata management module 260 updates the last timestamp 506 with the timestamp of the read request.

At step 610, the stripe metadata management module 260 increments the read count.

An STI is defined according to equation (2), below, as the average number of read requests for a given stripe during the interval between the last timestamp 506 and the start timestamp 504:

$$STI = \frac{\text{read count}}{\text{last timestamp} - \text{first timestamp}} \quad (2)$$

As shown in equation (2), stripes with more read requests in a given period of time will have a greater STI value than stripes that have fewer read requests in that same period of time.

Figure 7:
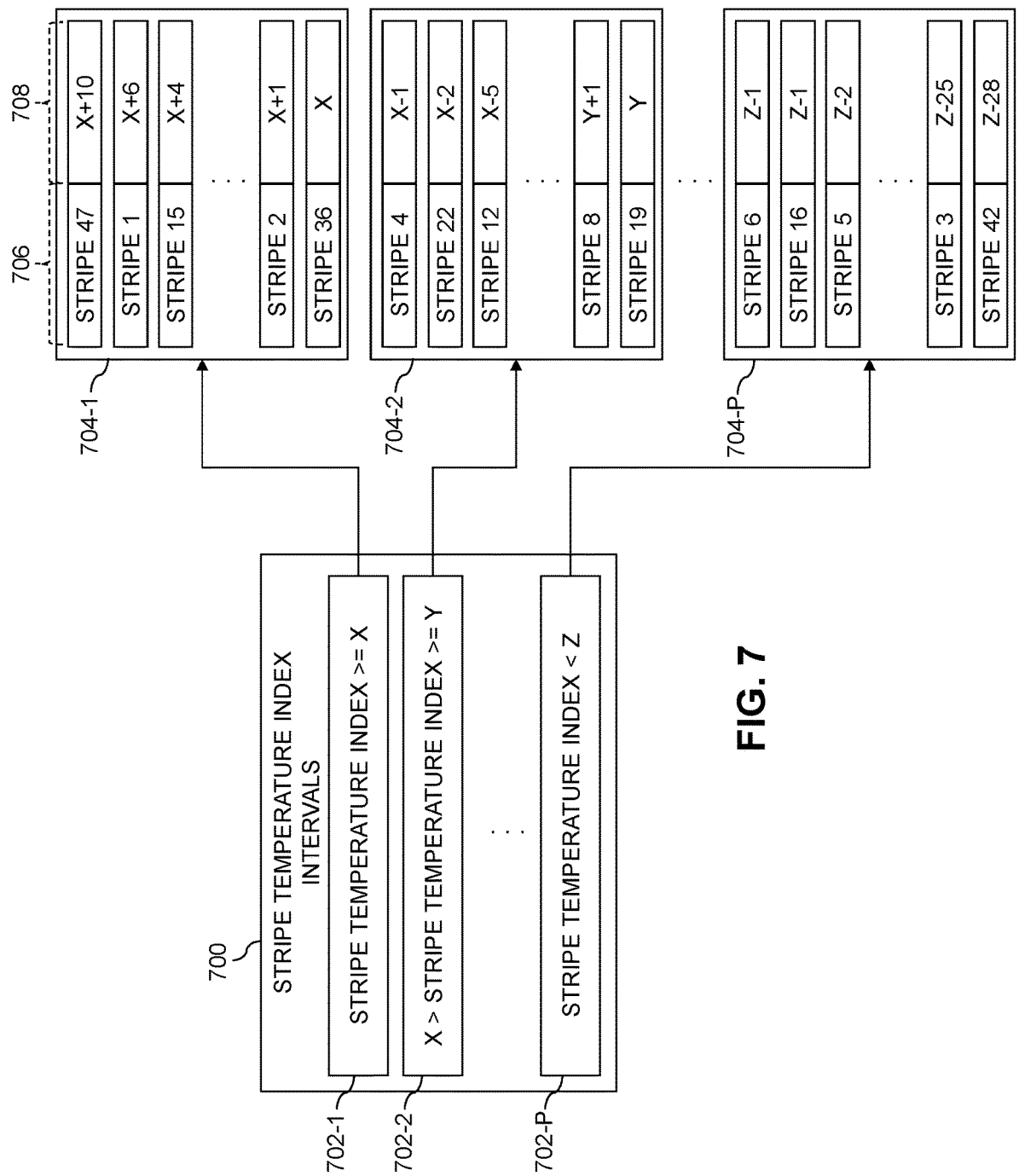
FIG. 7 schematically illustrates stripe metadata comprising a stripe temperature index intervals data structure, according to an exemplary embodiment of the disclosure.

With reference now to FIG. 7, stripe metadata management module 260 is also configured to maintain an STI intervals data structure 700. The STI intervals data structure 700 comprises entries corresponding to various read access frequency intervals, also referred to herein as STI intervals 702-1, 702-2 ... 702-P of STI values, individually and collectively referred to as STI intervals 702. For example, STI interval 702-1 corresponds to stripes having STI values greater than or equal to X, STI interval 702-2 corresponds to stripes having STI values less than X but greater than or equal to Y ... and STI interval 702-P corresponds to stripes having STI values that are less than Z. In illustrative embodiments, the values X, Y, Z and any other STI intervals may be predetermined, determined automatically according to a uniform or other distribution of the STI values or determined in any other manner.

For each STI interval 702-1, 702-2 ... 702-P, stripe metadata management module 260 maintains a corresponding Stripe-STI data structure 704-1, 704-2 ... 704-P, individually and collectively referred to as Stripe-STI data structures 704. Each entry in a Stripe-STI data structure 704 comprises an indication of a stripe 706 and corresponding STI value 708 for that stripe 706. In some embodiments, the stripes 706 may be arranged in order of highest to lowest STI value 708. In other embodiments, the indication of the stripes 706 and corresponding STI values 708 may simply be added to or stored in the Stripe-STI data structure 704 for a given STI interval 702 in any order.

In some embodiments, only the indication of the stripe 706 may be included in the Stripe-STI data structure 704 where, for example, the STI value 708 may not be stored. For example, in some cases, the stripe defragmentation control system 250 and stripe rebuild control system 254 may only need to determine that the stripe has an STI value in a given STI interval 702 for defragmentation or rebuild purposes but do not need to know the actual STI value 708 itself before performing their respective defragmentation or rebuild processes. In such a case, only the indication of the stripe 706 need be stored in the Stripe-STI data structure 704 corresponding to the appropriate STI interval 702.

The stripe type conversion control module 252 of the stripe defragmentation control system 250 is configured to utilize the STI intervals data structure 700 when relocating data pages from a stripe of a first type to a stripe of a second type. When the stripe type conversion control module 252 converts a stripe from a first type to a second type as part of the defragmentation process, e.g., converts a stripe of 16 KB blocks to a stripe of 8 KB blocks, it relocates all of the data pages stored in that stripe to a destination stripe of the first type. Typically, the destination stripe that is selected is the fullest stripe of that type which has enough space to contain the data pages that are being relocated.

In illustrative embodiments, the stripe type conversion control module 252 is further configured to the select the destination stripe based at least in part on the STI intervals data structure 700 as will be described in more detail below. For example, the stripe type conversion control module 252 is configured to select the destination stripe according to both its available space and its STI value, such that among the stripes with the required available space, the stripe type conversion control module 252 is configured to select the stripe with the closest STI value 708 to the source stripe or in the same STI interval 702 as the source stripe.

Figure 8:
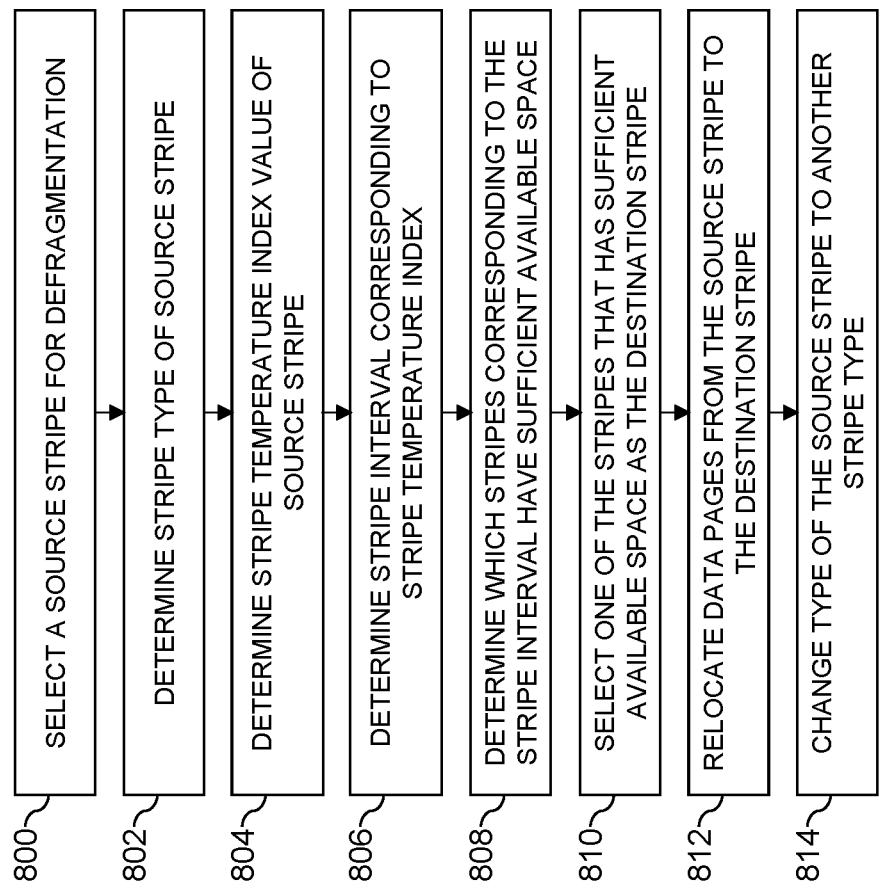
FIG. 8 is a flow diagram of a process for defragmenting a stripe utilizing the stripe temperature index intervals data structure of FIG. 7, according to an exemplary embodiment of the disclosure.

With reference now to FIG. 8, an example defragmentation process performed by stripe type conversion control module 252 will now be described.

At step 800, stripe type conversion control module 252 selects a source stripe for defragmentation.

At step 802, stripe type conversion control module 252 determines a stripe type of the source stripe, e.g., 16 KB, 8 KB, 4 KB, etc.

At step 804, stripe type conversion control module 252 determines the STI value of the source stripe, e.g., by accessing the STI metadata 502 for the source stripe. In some cases, stripe type conversion control module 252 may determine the STI value according to equation (2) above.

At step 806, stripe type conversion control module 252 determines which STI interval 702 of the STI intervals data structure 700 corresponds to the determined STI value for the source stripe. For example, in an example scenario, if the determined STI value is less than X but greater than or equal to Y, stripe type conversion control module 252 determines that STI interval 702-2 corresponds to the STI value for the source stripe.

At step 808, stripe type conversion control module 252 determines which stripes 706 in the corresponding Stripe-STI data structure 704 have sufficient available space for storing the data pages of the source stripe.

At step 810, stripe type conversion control module 252 selects one of the stripes 706 of the corresponding Stripe-STI data structure 704 as the destination stripe.

For example, in some embodiments, stripe type conversion control module 252 is configured to select the stripe 706 in the corresponding Stripe-STI data structure 704 that is the fullest stripe 706 that still has enough space for the data pages to be relocated from the source stripe. For example, in such an embodiment, a stripe may be selected as the destination stripe so long as the STI value of that stripe is within the same STI interval 702 as the STI value of the source stripe and that stripe is the fullest stripe in that interval that has enough space for storing the data pages of the source stripe that need to be relocated. In one example scenario, if the STI value of the source stripe is Y+1, the destination stripe will be selected from the Stripe-STI data structure 704-2 that corresponds to the STI interval 702-2. In this example, if the fullest stripe with enough space is stripe 22, having an STI value 708 of X−2, stripe 22 will be selected as the destination stripe even if stripe 8 having an STI value of Y+1 also has sufficient available space.

In some embodiments, stripe type conversion control module 252 is alternatively configured to select the stripe 706 in the Stripe-STI data structure 704 that has the closest STI value 708 to the source stripe and is the fullest stripe 706 that still has enough space for the data pages to be relocated from the source stripe, in that order of priority. Using the same example scenario described above, if the STI value of the source stripe is Y+1, the destination stripe will be selected from the Stripe-STI data structure 704-2 that corresponds to the STI interval 702-2. In this example, both stripe 8, having an STI value of Y+1, and stripe 22, having an STI value of X−2, have enough space to store the data pages of the source stripe but stripe 22 is fuller. Because the order of priority is to select the stripe based on the closest STI value to the source stripe followed by the fullest stripe that has space, stripe 8 will be selected in this embodiment. In an example scenario where stripe 8 did not have sufficient space but stripe 12 does have sufficient space, stripe 12 would be selected as the destination stripe over stripe 22 due to the ordering of priorities.

At step 812, stripe type conversion control module 252 relocates the data pages from the source stripe to the destination stripe.

At step 814, stripe type conversion control module 252 changes the type of the source stripe to another stripe type, e.g., to balance the available stripes.

By utilizing the STI intervals data structure 700 and the STI values of the stripes to select a destination stripe, the defragmentation process performed by the stripe type conversion control module 252 will group more data pages having similar or the same STI values together in the same stripes.

In illustrative embodiments, the stripe rebuild control module 256 is configured to determine the order in which stripes are be rebuilt after a storage device failure based at least in part on the STI intervals data structure 700 as will be described in more detail below. For example, the stripe rebuild control module 256 may be configured to prioritize the rebuilding of those stripes having the highest STI values or those stripes that are part of the highest STI interval first, such that the read requests having the highest probability of occurring are more likely to read pages that are already rebuilt, thereby inhibiting or avoiding the need to perform many degraded read operations.

Figure 9:
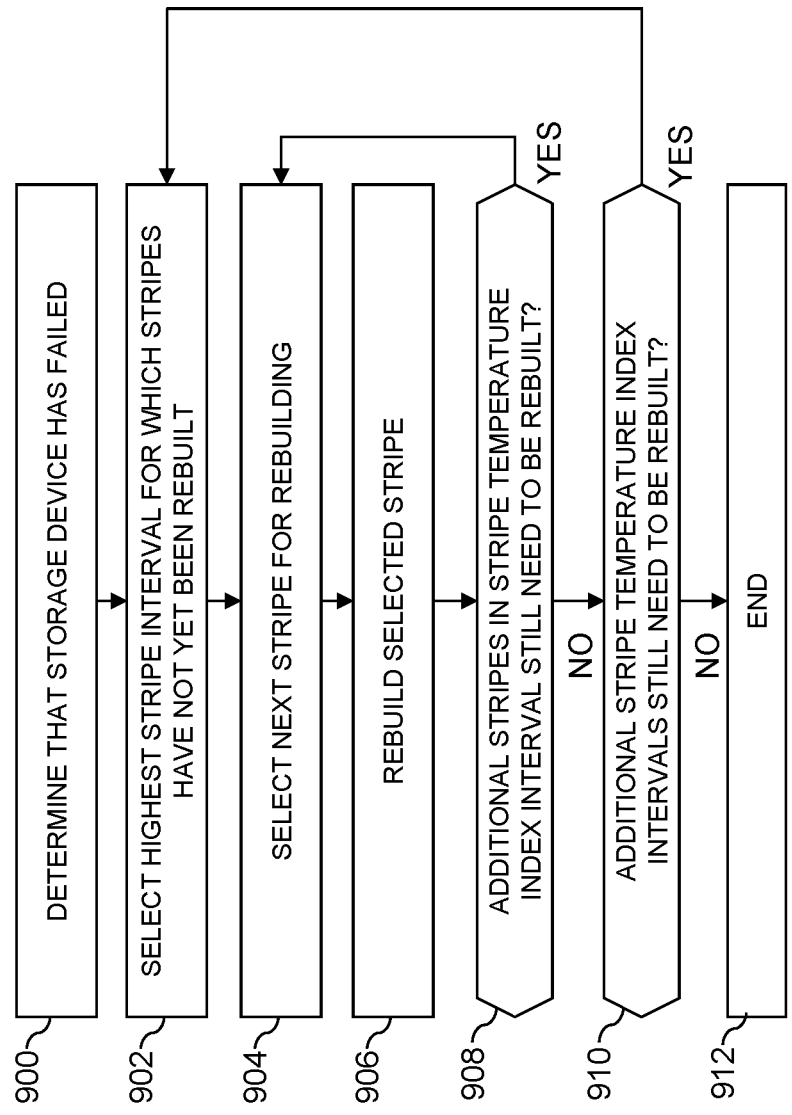
FIG. 9 is a flow diagram of a process for rebuilding a stripe utilizing the stripe temperature index intervals data structure of FIG. 7, according to an exemplary embodiment of the disclosure.

With reference now to FIG. 9, an example rebuild process performed by stripe rebuild control module 256 will now be described.

At step 900, stripe rebuild control module 256 determines that a storage device has failed.

At step 902, stripe rebuild control module 256 accesses the STI intervals data structure 700 and selects the highest STI interval 702 for which the stripes have not yet been rebuilt. For example, if the storage device failure has just occurred and no stripes have been rebuilt yet, STI interval 702-1 may be selected. If the stripes in the STI interval 702-1 have all been rebuilt, STI interval 702-2 may be selected, and so on. If all stripe intervals have been rebuilt, the process ends.

At step 904, stripe rebuild control module 256 selects the next stripe for rebuilding based at least in part on the Stripe-STI data structure 704 corresponding to the selected STI interval 702.

For example, the selected stripe may be the next stripe to be rebuilt in the order of the corresponding Stripe-STI data structure 704, e.g., stripe 47 in Stripe-STI data structure 704-1 if no stripes have yet been rebuilt, followed by stripe 1, stripe 15 . . . stripe 2 and finally stripe 36.

In another example, the selected stripe may be the next stripe to be rebuilt that has the highest STI value 708 in the corresponding Stripe-STI data structure 704, e.g., also stripe 47 in the example Stripe-STI data structure 704-1 of FIG. 7. In a case where the stripes are not stored within the corresponding Stripe-STI data structure 704 in order from highest STI value 708 to lowest STI value 708, the next stripe to be rebuilt in the order of the Stripe-STI data structure 704 may have an STI value that is lower than another stripe that still needs to be rebuilt in the Stripe-STI data structure 704 corresponding to that STI interval 702. In such a case, the stripe having the highest STI value 708 will be selected instead of the next stripe in the order.

At step 906, stripe rebuild control module 256 rebuilds the selected stripe.

At step 908, stripe rebuild control module 256 determines whether or not additional stripes still need to be rebuilt in the corresponding STI interval 702. If there are no more additional stripes, the process proceeds to step 910. If there are additional stripes to be rebuilt, the process returns to step 904.

At step 910, stripe rebuild control module 256 determines whether or not additional STI intervals 702 still need to be rebuilt. If there are no more additional STI intervals 702 to be rebuilt, the process proceeds to step 912 and ends. If there are additional STI intervals 702 to be rebuilt, the process returns to step 902.

As part of the stripe rebuild process performed by stripe rebuild control module 256, data may be relocated from the failed storage device(s) to other stripes. For example, when the failed storage device(s) store parity data, i.e., P or Q columns, another column that is stored on another storage device may be chosen to be the new parity storage location and the data pages that were previously stored in that column are moved to other stripes. In illustrative embodiments, the data that is being relocated may be relocated in a similar manner to data being relocated during defragmentation as described above. For example, the destination stripes for any data being relocated as part of the rebuild process may be selected according to the STI value associated with that data such that the destination stripe has a similar STI value to the relocated data.

In a case where a rebuild is performed on-demand, e.g., due to an IO read request being received by the storage system before the corresponding stripe has been rebuilt, the IO flow monitoring and control module 220 may mark the stripe for asynchronous "quick" rebuild by the stripe rebuild control module 256 since the data for that stripe is recovered as part of the degraded read process. For example, stripes that are recovered as part of the degraded read process may be prioritized ahead of the rebuilding of other stripes in the rebuild process by stripe rebuild control module since in order to complete the rebuild for that recovered stripe, stripe rebuild control module 256 will only need to perform only partial processing, e.g., determining where to store the recovered data. In this manner, the rebuild process for the recovered stripe will be shorter than a full rebuild of the recovered stripe. Since the rebuild of an already recovered stripe is prioritized, new read requests for data pages stored on that recovered stripe should not require another recovery.

By grouping pages with the same or similar STI values into the same stripes and prioritizing the rebuild of stripes having higher STI values, the rebuild process will recover more "hot" pages sooner, which significantly improves the read latency of the storage system during a rebuild in response to one or more failed storage devices and also reduce the load on the system. In this manner, the need to perform additional data recovery operations on-demand for incoming the read requests is reduced, thus improving the overall system performance.

Figure 10:
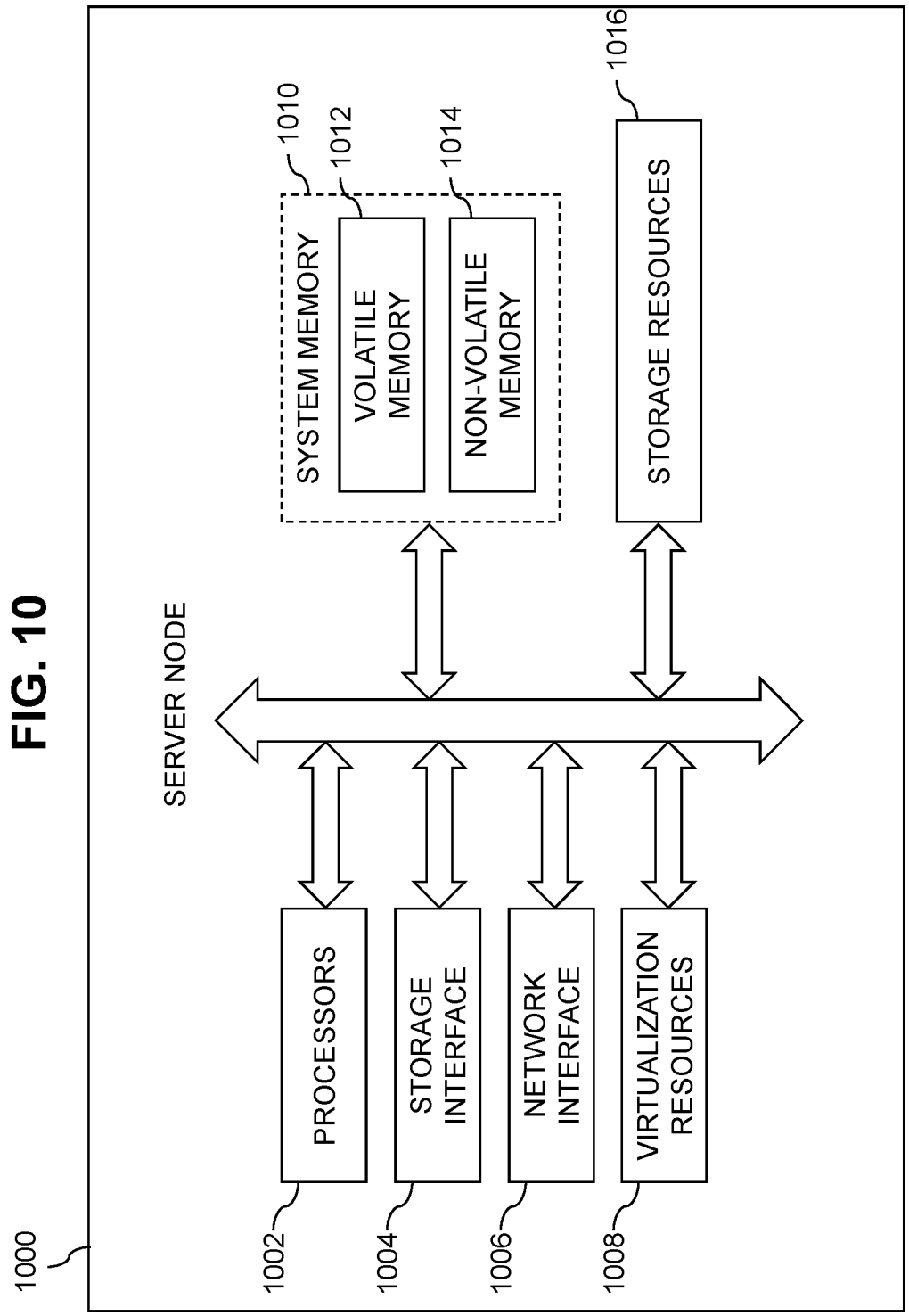
FIG. 10 schematically illustrates a framework of a server node which can host a storage system having a storage control system that is configured according to an exemplary embodiment of the disclosure.

FIG. 10 schematically illustrates a framework of a server node which can host a data storage system that is configured to implement exemplary embodiments of the disclosure. The server node 1000 comprises processors 1002, storage interface circuitry 1004, network interface circuitry 1006, virtualization resources 1008, system memory 1010, and storage resources 1016. The system memory 1010 comprises volatile memory 1012 and non-volatile memory 1014. The processors 1002 comprise one or more types of hardware processors that are configured to process program instructions and data to execute a native operating system (OS) and applications that run on the server node 1000.

For example, the processors 1002 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 1004 enables the processors 1002 to interface and communicate with the system memory 1010, the storage resources 1016, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 1006 enables the server node 1000 to interface and communicate with a network and other system components. The network interface circuitry 1006 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, IO adaptors, converged Ethernet adaptors, etc.) to support communication protocols and interfaces including, but not limited to, PCIe, DMA and RDMA data transfer protocols, etc.

The virtualization resources 1008 can be instantiated to execute one or more service or functions which are hosted by the server node 1000. For example, the virtualization resources 1008 can be configured to implement the various modules and functionalities of the storage control system 210 (FIG. 2) as discussed herein. In one embodiment, the virtualization resources 1008 comprise virtual machines that are implemented using a hypervisor platform which executes on the server node 1000, wherein one or more virtual machines can be instantiated to execute functions of the server node 1000. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 1000, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 1008 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 1000 as well execute one or more of the various modules and functionalities as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of, e.g., storage control system 210 (FIG. 2), comprise program code that is loaded into the system memory 1010 (e.g., volatile memory 1012), and executed by the processors 1002 to perform respective functions as described herein. In this regard, the system memory 1010, the storage resources 1016, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 1010 comprises various types of memory such as volatile RAM, NVRAM, or other types of memory, in any combination. The volatile memory 1012 may be a dynamic random-access memory (DRAM) (e.g., DRAM DIMM (Dual. In-line Memory Module), or other forms of volatile RAM. The non-volatile memory 1014 may comprise one or more of NAND Flash storage devices, SSD devices, or other types of next generation non-volatile memory (NGNVM) devices. The system memory 1010 can be implemented using a hierarchical memory tier structure wherein the volatile system memory 1012 is configured as the highest-level memory tier, and the non-volatile system memory 1014 (and other additional non-volatile memory devices which comprise storage-class memory) is configured as a lower level memory tier which is utilized as a high-speed load/store non-volatile memory device on a processor memory bus (i.e., data is accessed with loads and stores, instead of with IO reads and writes). The term "memory" or "system memory" as used herein refers to volatile and/or non-volatile memory which is utilized to store application program instructions that are read and processed by the processors 1002 to execute a native operating system and one or more applications or processes hosted by the server node 1000, and to temporarily store data that is utilized and/or generated by the native OS and application programs and processes running on the server node 1000. The storage resources 1016 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:

maintaining stripe metadata corresponding to a plurality of stripes of data stored on a plurality of storage devices of a storage system, the stripe metadata comprising at least a first timestamp, a second timestamp and a read count for each stripe, the first and second timestamps for a given one of the stripes being associated with potentially different read requests directed to the given stripe, each of the first and second timestamps being stored as part of the stripe metadata and collectively defining a variable-length interval that is compared to a threshold interval to control resetting of the read count, the variable-length interval for the given stripe being updated with each of a plurality of additional read requests following a first read request associated with the first timestamp, by updating of the second timestamp to a timestamp associated with a most recent one of the plurality of additional read requests;

obtaining a read request associated with a given stripe of the plurality of stripes, the read request having an associated timestamp;

determining, based at least in part on the obtained read request, whether or not a time period for the given stripe has been exceeded;

updating the stripe metadata corresponding to the given stripe based at least in part on the determination of whether or not the time period for the given stripe has been exceeded and the associated timestamp of the read request;

determining a read access frequency of the given stripe based at least in part on the read count, the first timestamp and the second timestamp of the updated stripe metadata for the given stripe, wherein determining the read access frequency comprises computing the read access frequency as a function of the read count and the variable-length interval collectively defined by the first and second timestamps; and performing at least one of a defragmentation process and a rebuild process based at least in part on the determined read access frequency of the given stripe;
wherein the stripe metadata corresponding to the plurality of stripes of data further comprises a plurality of different metadata portions for respective ones of a plurality of read access frequency intervals, each read access frequency interval corresponding to a range of read access frequency values, each read access frequency interval having a corresponding data structure that comprises an indication of which stripes have read access frequencies that are within that read access frequency interval; and
wherein the method is performed by at least one processing device of the storage system, the at least one processing device comprising a processor coupled to memory.

2. The method of claim 1, wherein:
determining whether or not the time period for the given stripe has been exceeded comprises determining that the time period for the given stripe has been exceeded; and
updating the stripe metadata corresponding to the given stripe comprises:
resetting the read count;
setting the first timestamp to the associated timestamp of the read request;
setting the second timestamp to the associated timestamp of the read request; and
incrementing the read count.

3. The method of claim 1, wherein:
determining whether or not the time period for the given stripe has been exceeded comprises determining that the time period for the given stripe has not been exceeded; and
updating the stripe metadata corresponding to the given stripe comprises:
setting the second timestamp to the associated timestamp of the read request; and
incrementing the read count.

4. The method of claim 1, further comprising:
updating the indication in the data structure corresponding to the read access frequency interval comprising the read access frequency of the given stripe to include an indication that the given stripe has a read access frequency within that read access frequency interval; and
performing the at least one of the defragmentation process and the rebuild process based at least in part on the determined read access frequency of the given stripe comprises performing the at least one of the defragmentation process and the rebuild process based at least in part on the plurality of read access frequency intervals.

5. The method of claim 4, wherein performing the at least one of the defragmentation process and the rebuild process comprises performing the defragmentation process, the defragmentation process comprising:
selecting a source stripe for defragmentation;
determining a read access frequency of the source stripe based at least in part on the stripe metadata for the source stripe;
selecting the read access frequency interval that corresponds to the read access frequency of the source stripe;
determining which stripes indicated by the data structure corresponding to the selected read access frequency interval have sufficient available space to store data pages to be relocated from the source stripe;
selecting one of the determined stripes that has sufficient available space as a destination stripe; and
relocating the data pages of the source stripe to the destination stripe.

6. The method of claim 5, wherein selecting the one of the determined stripes that has sufficient available space as the destination stripe further comprises one of:
selecting the determined stripe that has the highest read access frequency;
selecting the determined stripe that has the smallest amount of available space.

7. The method of claim 4, wherein performing the at least one of the defragmentation process and the rebuild process comprises performing the rebuild process, the rebuild process comprising:
determining that a storage device has failed;
selecting the read access frequency interval that corresponds to the highest range of read access frequencies for which all stripes have not been rebuilt;
determining which stripes have not yet been rebuilt for the selected read access frequency interval based at least in part on the indication of which stripes have read access frequencies that are within the selected read access frequency interval;
selecting the next stripe for rebuilding based at least in part the determination of which stripes have not yet been rebuilt; and
rebuilding the selected next stripe.

8. The method of claim 7, wherein selecting the next stripe for rebuilding comprises one of:
selecting the stripe that has not yet been rebuilt that has the highest read access frequency in the selected read access frequency interval; and
selecting the stripe that has not yet been rebuilt that is next in order in the data structure.

9. An article of manufacture comprising a non-transitory processor-readable storage medium having stored therein program code of one or more software programs, wherein the program code is executable by one or more processors to implement a method which comprises:
maintaining stripe metadata corresponding to a plurality of stripes of data stored on a plurality of storage devices of a storage system, the stripe metadata comprising at least a first timestamp, a second timestamp and a read count for each stripe, the first and second timestamps for a given one of the stripes being associated with potentially different read requests directed to the given stripe, each of the first and second timestamps being stored as part of the stripe metadata and collectively defining a variable-length interval that is compared to a threshold interval to control resetting of the read count, the variable-length interval for the given stripe being updated with each of a plurality of additional read requests following a first read request associated with the first timestamp, by updating of the second timestamp to a timestamp associated with a most recent one of the plurality of additional read requests;
obtaining a read request associated with a given stripe of the plurality of stripes, the read request having an associated timestamp;
determining, based at least in part on the obtained read request, whether or not a time period for the given stripe has been exceeded;
updating the stripe metadata corresponding to the given stripe based at least in part on the determination of whether or not the time period for the given stripe has been exceeded and the associated timestamp of the read request;

determining a read access frequency of the given stripe based at least in part on the read count, the first timestamp and the second timestamp of the updated stripe metadata for the given stripe, wherein determining the read access frequency comprises computing the read access frequency as a function of the read count and the variable-length interval collectively defined by the first and second timestamps; and performing at least one of a defragmentation process and a rebuild process based at least in part on the determined read access frequency of the given stripe;

wherein the stripe metadata corresponding to the plurality of stripes of data further comprises a plurality of different metadata portions for respective ones of a plurality of read access frequency intervals, each read access frequency interval corresponding to a range of read access frequency values, each read access frequency interval having a corresponding data structure that comprises an indication of which stripes have read access frequencies that are within that read access frequency interval.

10. The article of manufacture of claim 9, wherein:
the method further comprises:
updating the indication in the data structure corresponding to the read access frequency interval comprising the read access frequency of the given stripe to include an indication that the given stripe has a read access frequency within that read access frequency interval; and performing the at least one of the defragmentation process and the rebuild process based at least in part on the determined read access frequency of the given stripe comprises performing the at least one of the defragmentation process and the rebuild process based at least in part on the plurality of read access frequency intervals.

11. The article of manufacture of claim 10, wherein performing the at least one of the defragmentation process and the rebuild process comprises performing the defragmentation process, the defragmentation process comprising:
selecting a source stripe for defragmentation;
determining a read access frequency of the source stripe based at least in part on the stripe metadata for the source stripe;
selecting the read access frequency interval that corresponds to the read access frequency of the source stripe;
determining which stripes indicated by the data structure corresponding to the selected read access frequency interval have sufficient available space to store data pages to be relocated from the source stripe;
selecting one of the determined stripes that has sufficient available space as a destination stripe; and
relocating the data pages of the source stripe to the destination stripe.

12. The article of manufacture of claim 11, wherein selecting the one of the determined stripes that has sufficient available space as the destination stripe further comprises one of:
selecting the determined stripe that has the highest read access frequency;
selecting the determined stripe that has the smallest amount of available space.

13. The article of manufacture of claim 10, wherein performing the at least one of the defragmentation process and the rebuild process comprises performing the rebuild process, the rebuild process comprising:
determining that a storage device has failed;
selecting the read access frequency interval that corresponds to the highest range of read access frequencies for which all stripes have not been rebuilt;
determining which stripes have not yet been rebuilt for the selected read access frequency interval based at least in part on the indication of which stripes have read access frequencies that are within the selected read access frequency interval;
selecting the next stripe for rebuilding based at least in part the determination of which stripes have not yet been rebuilt; and
rebuilding the selected next stripe.

14. The article of manufacture of claim 13, wherein selecting the next stripe for rebuilding comprises one of:
selecting the stripe that has not yet been rebuilt that has the highest read access frequency in the selected read access frequency interval; and
selecting the stripe that has not yet been rebuilt that is next in order in the data structure.

15. An apparatus, comprising:
a storage system comprising a plurality of stripes of data stored on a plurality of storage devices; and
at least one processing device comprising a processor coupled to memory, the at least one processing device being configured:
to maintain stripe metadata corresponding to a plurality of stripes, the stripe metadata comprising at least a first timestamp, a second timestamp and a read count for each stripe, the first and second timestamps for a given one of the stripes being associated with potentially different read requests directed to the given stripe, each of the first and second timestamps being stored as part of the stripe metadata and collectively defining a variable-length interval that is compared to a threshold interval to control resetting of the read count, the variable-length interval for the given stripe being updated with each of a plurality of additional read requests following a first read request associated with the first timestamp, by updating of the second timestamp to a timestamp associated with a most recent one of the plurality of additional read requests;
to obtain a read request associated with a given stripe of the plurality of stripes, the read request having an associated timestamp;
to determine, based at least in part on the obtained read request, whether or not a time period for the given stripe has been exceeded;
to update the stripe metadata corresponding to the given stripe based at least in part on the determination of whether or not the time period for the given stripe has been exceeded and the associated timestamp of the read request;
to determine a read access frequency of the given stripe based at least in part on the read count, the first timestamp and the second timestamp of the updated stripe metadata for the given stripe, wherein determining the read access frequency comprises computing the read access frequency as a function of the read count and the variable-length interval collectively defined by the first and second timestamps; and to perform at least one of a defragmentation process and a rebuild process based at least in part on the determined read access frequency of the given stripe;

wherein the stripe metadata corresponding to the plurality of stripes of data further comprises a plurality of different metadata portions for respective ones of a plurality of read access frequency intervals, each read access frequency interval corresponding to a range of read access frequency values, each read access frequency interval having a corresponding data structure that comprises an indication of which stripes have read access frequencies that are within that read access frequency interval.

16. The apparatus of claim 15, wherein:

the at least one processing device is further configured:

to update the indication in the data structure corresponding to the read access frequency interval comprising the read access frequency of the given stripe to include an indication that the given stripe has a read access frequency within that read access frequency interval; and to perform the at least one of the defragmentation process and the rebuild process based at least in part on the determined read access frequency of the given stripe comprises performing the at least one of the defragmentation process and the rebuild process based at least in part on the plurality of read access frequency intervals.

17. The apparatus of claim 16, wherein performing the at least one of the defragmentation process and the rebuild process comprises performing the defragmentation process, the defragmentation process comprising:

selecting a source stripe for defragmentation;

determining a read access frequency of the source stripe based at least in part on the stripe metadata for the source stripe;

selecting the read access frequency interval that corresponds to the read access frequency of the source stripe;

determining which stripes indicated by the data structure corresponding to the selected read access frequency interval have sufficient available space to store data pages to be relocated from the source stripe;

selecting one of the determined stripes that has sufficient available space as a destination stripe; and relocating the data pages of the source stripe to the destination stripe.

18. The apparatus of claim 17, wherein selecting the one of the determined stripes that has sufficient available space as the destination stripe further comprises one of:

selecting the determined stripe that has the highest read access frequency;

selecting the determined stripe that has the smallest amount of available space.

19. The apparatus of claim 16, wherein performing the at least one of the defragmentation process and the rebuild process comprises performing the rebuild process, the rebuild process comprising:

determining that a storage device has failed;

selecting the read access frequency interval that corresponds to the highest range of read access frequencies for which all stripes have not been rebuilt;

determining which stripes have not yet been rebuilt for the selected read access frequency interval based at least in part on the indication of which stripes have read access frequencies that are within the selected read access frequency interval;

selecting the next stripe for rebuilding based at least in part the determination of which stripes have not yet been rebuilt; and rebuilding the selected next stripe.

20. The apparatus of claim 19, wherein selecting the next stripe for rebuilding comprises one of:

selecting the stripe that has not yet been rebuilt that has the highest read access frequency in the selected read access frequency interval; and selecting the stripe that has not yet been rebuilt that is next in order in the data structure.

* * * * *